(12) United States Patent
Kamo et al.

(10) Patent No.: US 10,868,303 B2
(45) Date of Patent: Dec. 15, 2020

(54) NEGATIVE ELECTRODE ACTIVE MATERIAL, MATERIAL OF MIXED NEGATIVE ELECTRODE ACTIVE MATERIAL, NEGATIVE ELECTRODE FOR NON-AQUEOUS ELECTROLYTE SECONDARY BATTERY, LITHIUM ION SECONDARY BATTERY, METHOD FOR PRODUCING NEGATIVE ELECTRODE ACTIVE MATERIAL AND METHOD FOR PRODUCING LITHIUM ION SECONDARY BATTERY

(71) Applicant: SHIN-ETSU CHEMICAL CO., LTD., Tokyo (JP)

(72) Inventors: Hiromichi Kamo, Takasaki (JP); Masahiro Furuya, Takasaki (JP); Hidekazu Awano, Takasaki (JP); Takakazu Hirose, Annaka (JP); Takumi Matsuno, Annaka (JP); Katsunori Nishiura, Chiba (JP); Nan Fang, Ichihara (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 158 days.

(21) Appl. No.: 16/077,345

(22) PCT Filed: Feb. 14, 2017

(86) PCT No.: PCT/JP2017/005232
§ 371 (c)(1),
(2) Date: Aug. 10, 2018

(87) PCT Pub. No.: WO2017/145853
PCT Pub. Date: Aug. 31, 2017

(65) Prior Publication Data
US 2019/0051897 A1 Feb. 14, 2019

(30) Foreign Application Priority Data
Feb. 23, 2016 (JP) .................................. 2016-032198

(51) Int. Cl.
*H01M 4/48* (2010.01)
*H01M 4/58* (2010.01)
(Continued)

(52) U.S. Cl.
CPC ........... *H01M 4/483* (2013.01); *H01M 4/364* (2013.01); *H01M 4/382* (2013.01); *H01M 4/485* (2013.01);
(Continued)

(58) Field of Classification Search
CPC ...... H01M 4/483; H01M 4/364; H01M 4/382; H01M 4/485; H01M 4/5825; H01M 4/62;
(Continued)

(56) References Cited

U.S. PATENT DOCUMENTS

| 5,395,711 A | 3/1995 | Tahara et al. |
| 2006/0083987 A1 | 4/2006 | Konishiike et al. |

(Continued)

FOREIGN PATENT DOCUMENTS

| CN | 103250283 A | 8/2013 |
| CN | 104620427 A | 5/2015 |

(Continued)

OTHER PUBLICATIONS

Aug. 21, 2019 Extended European Search Report issued in European Patent Application No. 17756294.9.
(Continued)

*Primary Examiner* — Jane J Rhee
(74) *Attorney, Agent, or Firm* — Oliff PLC

(57) ABSTRACT

A negative electrode active material contains particle of the negative electrode active material, wherein the particle of
(Continued)

the negative electrode active material contains particle of a silicon compound which contains a silicon compound ($SiO_x$: $0.5 \leq x \leq 1.6$), the particle of the silicon compound contains lithium, and the particle of the negative electrode active material has a total content rate of a polyphenylene compound component and a polycyclic aromatic component measured by TPD-MS of 1 ppm by mass or more and 4,000 ppm by mass or less. As a result, a negative electrode active material is capable of improving cycle characteristics and initial charge/discharge characteristics when it is used as a negative electrode active material of a lithium ion secondary battery.

20 Claims, 5 Drawing Sheets

(51) Int. Cl.

| | | |
|---|---|---|
| *H01M 4/36* | (2006.01) | |
| *H01M 4/62* | (2006.01) | |
| *H01M 4/485* | (2010.01) | |
| *H01M 4/38* | (2006.01) | |
| *H01M 4/66* | (2006.01) | |
| *H01M 4/587* | (2010.01) | |
| *H01M 4/02* | (2006.01) | |
| *H01M 10/0525* | (2010.01) | |

(52) U.S. Cl.
CPC ........... *H01M 4/5825* (2013.01); *H01M 4/62* (2013.01); *H01M 4/366* (2013.01); *H01M 4/587* (2013.01); *H01M 4/625* (2013.01); *H01M 4/66* (2013.01); *H01M 10/0525* (2013.01); *H01M 2004/021* (2013.01); *H01M 2004/027* (2013.01)

(58) Field of Classification Search
CPC ...... H01M 4/366; H01M 4/578; H01M 4/625; H01M 4/66; H01M 10/0525; H01M 2004/021; H01M 2004/027
See application file for complete search history.

(56) References Cited

U.S. PATENT DOCUMENTS

| | | | |
|---|---|---|---|
| 2006/0099507 A1 | 5/2006 | Kogetsu et al. | |
| 2008/0176137 A1 | 7/2008 | Endo et al. | |
| 2009/0075173 A1 | 3/2009 | Jeong et al. | |
| 2009/0202911 A1 | 8/2009 | Fukuoka et al. | |
| 2013/0149606 A1 | 6/2013 | Yasuda et al. | |
| 2014/0205907 A1 | 7/2014 | Kang et al. | |
| 2015/0221950 A1 | 8/2015 | Minami et al. | |
| 2016/0233484 A1 | 8/2016 | Hirose et al. | |
| 2016/0254537 A1 | 9/2016 | Kamo et al. | |
| 2017/0040599 A1 | 2/2017 | Kamo et al. | |
| 2017/0179529 A1 | 6/2017 | Qian et al. | |
| 2018/0198158 A1 | 7/2018 | Kamo et al. | |

FOREIGN PATENT DOCUMENTS

| | | |
|---|---|---|
| CN | 105336982 A | 2/2016 |
| CN | 105446982 A | 3/2016 |
| EP | 2 088 221 A1 | 8/2009 |
| EP | 2 610 949 A1 | 7/2013 |
| EP | 2 768 051 A1 | 8/2014 |
| EP | 3 062 371 A1 | 8/2016 |
| EP | 3 096 379 A1 | 11/2016 |
| EP | 3 322 006 A1 | 5/2018 |
| JP | 2997741 B2 | 1/2000 |
| JP | 2001-185127 A | 7/2001 |
| JP | 2002-042806 A | 2/2002 |
| JP | 2005-235439 A | 9/2005 |
| JP | 2005-235589 A | 9/2005 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2015-156328 A | 8/2015 |
| JP | 2016-058191 A | 4/2016 |
| WO | 2015/025443 A1 | 2/2015 |
| WO | 2017/006561 A1 | 1/2017 |

OTHER PUBLICATIONS

Aug. 28, 2018 International Preliminary Report on Patentability issued in International Patent Application No. PCT/JP2017/005232.
Apr. 4, 2017 International Search Report issued in International Patent Application No. PCT/JP2017/005232.
Chen, Yao et al. "Li+-Conductive Polymer-Embedded Nano-Si Particles as Anode Material for Advanced Li-ion Batteries". ACS Applied Materials & Interfaces, vol. 6, 3508-3512, 2014.
Jun. 18, 2020 Office Action issued in Taiwanese Patent Application No. 106105535.
Sep. 29, 2020 Office Action issued in Chinese Patent Application No. 201780012437.9.

NEGATIVE ELECTRODE ACTIVE MATERIAL, MATERIAL OF MIXED NEGATIVE ELECTRODE ACTIVE MATERIAL, NEGATIVE ELECTRODE FOR NON-AQUEOUS ELECTROLYTE SECONDARY BATTERY, LITHIUM ION SECONDARY BATTERY, METHOD FOR PRODUCING NEGATIVE ELECTRODE ACTIVE MATERIAL AND METHOD FOR PRODUCING LITHIUM ION SECONDARY BATTERY

TECHNICAL FIELD

The present invention relates to a negative electrode active material capable of storing and releasing lithium ions, a material of mixed negative electrode active material containing the negative electrode active material, a negative electrode for a non-aqueous electrolyte secondary battery having a layer of the negative electrode active material formed with the material of the mixed negative electrode active material, a lithium ion secondary battery using the negative electrode, a method for producing the negative electrode active material and a method for producing the lithium ion secondary battery.

BACKGROUND ART

In recent years, small electronic devices represented by mobile terminals and the like have been widely spread, and further miniaturization, weight reduction and prolongation of life are strongly required. In response to such market demands, development of secondary batteries that are particularly compact, lightweight and capable of obtaining high energy density has been progressed. This secondary battery has been also investigated to apply, not limited only to small sized electronic devices, to large sized electronic devices represented by an automobile and the like, and power storage system represented by houses and the like.

Among these, a lithium ion secondary battery is markedly expected since it is easy to make compact and high capacity, and can obtain high energy density than those of lead batteries and nickel cadmium batteries.

The above-described lithium ion secondary battery has an electrolytic solution together with a positive electrode, a negative electrode and a separator, and the negative electrode contains a negative electrode active material which participates in a charge and discharge reaction.

As the negative electrode active material, a carbon-based active material has widely been used, and on the other hand, further improvement in battery capacity has been required from recent market demands. In order to improve the battery capacity, it has been investigated to use silicon as a negative electrode active material. This is because theoretical capacity of silicon (4,199 mAh/g) is not less than 10 times larger than the theoretical capacity of graphite (372 mAh/g), so that significant improvement in battery capacity can be expected. Development of a silicon material as a material of the negative electrode active material has been investigated not only regarding a silicon simple substance but also regarding a compound represented by an alloy or an oxide and the like. Also, the shape of the active material has been widely investigated from a coating type which is a standard in the carbon-based active material to an integrated type which is directly deposited on a current collector.

However, when silicon is used as a main raw material of the negative electrode active material, the negative electrode active material expands and shrinks at the time of charge and discharge, so that it is likely to break mainly in the vicinity of the surface layer of the negative electrode active material. In addition, an ionic substance is generated inside the active material, and the negative electrode active material becomes a substance which is easily broken. If the surface layer of the negative electrode active material is broken, a new surface is generated thereby, so that the reaction area of the active material increases. At this time, a decomposition reaction of the electrolytic solution occurs on the new surface, and a coating film which is a decomposed product of the electrolytic solution is formed on the new surface, so that the electrolytic solution is consumed. Therefore, the cycle characteristics tend to be likely lowered.

Various investigations have been made until now on negative electrode materials for lithium ion secondary batteries comprising a silicon material as a main component and electrode constitution in order to improve initial battery efficiency and cycle characteristics.

Specifically, for the purpose of obtaining good cycle characteristics and high safety, silicon and amorphous silicon dioxide are simultaneously deposited by a vapor phase method (for example, see Patent Document 1). In addition, in order to obtain high battery capacity and safety, a carbon material (electron conductive material) is provided on a surface layer of silicon oxide particle (for example, see Patent Document 2). Further, in order to improve cycle characteristics and to obtain high input-output characteristics, an active material containing silicon and oxygen is prepared and an active material layer having a high oxygen ratio is formed in the vicinity of a current collector (for example, see Patent Document 3). Also, in order to improve cycle characteristics, it is so constituted that oxygen is contained in a silicon active material, an average oxygen content is 40 at % or less, and the oxygen content is increased in a place close to a current collector (for example, see Patent Document 4).

Also, in order to improve first time charge/discharge efficiency, a nanocomposite containing a Si phase, $SiO_2$ and $M_yO$ metal oxide is used (for example, see Patent Document 5). Further, in order to improve cycle characteristics, $SiO_x$ ($0.8 \leq x \leq 1.5$, particle size range=1 μm to 50 μm) and a carbon material are mixed and baked at a high temperature (for example, see Patent Document 6). Moreover, in order to improve cycle characteristics, a molar ratio of oxygen to silicon in a negative electrode active material is set to 0.1 to 1.2, and the active material is controlled in the range that the difference between the maximum value and the minimum value of the molar ratio in the vicinity of boundary between the active material and a current collector is 0.4 or less (for example, see Patent Document 7). Furthermore, in order to improve battery load characteristics, a metal oxide containing lithium is used (for example, see Patent Document 8). Also, in order to improve cycle characteristics, a hydrophobic layer such as a silane compound is formed on a surface layer of a silicon material (for example, see Patent Document 9). Further, in order to improve cycle characteristics, silicon oxide is used and a graphite coating is formed on the surface layer thereof to impart conductivity (for example, see Patent Document 10). In Patent Document 10, with regard to a shift value obtained from the RAMAN spectrum relating to a graphite coating, broad peaks appear at 1330 $cm^{-1}$ and 1580 $cm^{-1}$, and their intensity ratio $I_{1330}/I_{1580}$ is $1.5 < I_{1330}/I_{1580} < 3$. Moreover, in order to improve battery capacity and cycle characteristics, particle having a silicon microcrystalline phase dispersed in silicon dioxide is used (for example, see Patent Document 11). Furthermore, in order to improve overcharge and overdischarge characteristics, silicon oxide whose ratio of atomic number of silicon and oxygen is controlled to 1:y (0<y<2) is used (for example, see Patent Document 12).

CITATION LIST

Patent Literatures

Patent Document 1: Japanese Unexamined Patent Publication (Kokai) No. 2001-185127
Patent Document 2: Japanese Unexamined Patent Publication (Kokai) No. 2002-042806
Patent Document 3: Japanese Unexamined Patent Publication (Kokai) No. 2006-164954
Patent Document 4: Japanese Unexamined Patent Publication (Kokai) No. 2006-114454
Patent Document 5: Japanese Unexamined Patent Publication (Kokai) No. 2009-070825
Patent Document 6: Japanese Unexamined Patent Publication (Kokai) No. 2008-282819
Patent Document 7: Japanese Unexamined Patent Publication (Kokai) No. 2008-251369
Patent Document 8: Japanese Unexamined Patent Publication (Kokai) No. 2008-177346
Patent Document 9: Japanese Unexamined Patent Publication (Kokai) No. 2007-234255
Patent Document 10: Japanese Unexamined Patent Publication (Kokai) No. 2009-212074
Patent Document 11: Japanese Unexamined Patent Publication (Kokai) No. 2009-205950
Patent Document 12: Japanese Patent No. 2,997,741

SUMMARY OF THE INVENTION

Problems to be Solved by the Invention

As described above, in recent years, miniaturized mobile devices represented by electronic devices have been improved in high performance and multifunctionalization, and an increase in battery capacity is required for lithium ion secondary batteries, which is the main power source thereof. As one means to solve the problem, development of a lithium ion secondary battery comprising a negative electrode using a silicon material as a main material has been desired. In addition, the lithium ion secondary battery using the silicon material has been desired to have the cycle characteristics similar to those of a lithium ion secondary battery using a carbon-based active material. However, it has not yet been reached to propose a negative electrode active material having first time efficiency and cycle stability equivalent to that of a lithium ion secondary battery using a carbon-based active material.

The present invention was made in view of the above problem, and it is an object of the present invention to provide a negative electrode active material capable of improving cycle characteristics and initial charge/discharge characteristics when it is used as a negative electrode active material of a lithium ion secondary battery. The present invention is also to provide a material of mixed negative electrode active material containing the negative electrode active material, a negative electrode for a non-aqueous electrolyte secondary battery which has a layer of the negative electrode active material formed with the material of the mixed negative electrode active material, and a lithium ion secondary battery using the negative electrode. The present invention is further to provide a method for producing such a negative electrode active material, and a method for producing a lithium ion secondary battery using the negative electrode active material thus produced.

Means to Solve the Problems

To accomplish the objects, the present invention provides a negative electrode active material containing particle of a negative electrode active material, wherein the particle of the negative electrode active material contains particle of a silicon compound which contains a silicon compound ($SiO_x$: $0.5 \leq x \leq 1.6$), the particle of the silicon compound contains lithium, and the particle of the negative electrode active material has a total content rate of a polyphenylene compound component and a polycyclic aromatic component measured by TPD-MS of 1 ppm by mass or more and 4,000 ppm by mass or less.

Thus, when the particle of the negative electrode active material containing the polyphenylene compound component and the polycyclic aromatic component with a total content rate measured by TPD-MS (Temperature Programmed Desorption-Mass Spectroscopy: temperature rising thermal desorption-mass spectrometry method) in the range is used, stability of the surface of the particle of the negative electrode active material is improved by the polyphenylene compound component or the polycyclic aromatic component. Therefore, when such a negative electrode active material containing the particle of the negative electrode active material is used for a negative electrode active material of a lithium ion secondary battery, a battery having good cycle characteristics and initial charge/discharge characteristics together with high battery capacity can be obtained.

At this time, the total content rate of the polyphenylene compound component and the polycyclic aromatic component is preferably 1 ppm by mass or more and 1,000 ppm by mass or less.

If the total content rate of the polyphenylene compound component and the polycyclic aromatic component of the particle of the negative electrode active material is in the range, when the negative electrode active material containing the particle of the negative electrode active material is used for the negative electrode active material of the lithium ion secondary battery, better cycle characteristics and initial charge/discharge characteristics can be obtained.

In the negative electrode active material of the present invention, the polyphenylene compound can be at least one of a biphenyl, a terphenyl and a derivative thereof, and the polycyclic aromatic can be at least one of naphthalene, anthracene, phenanthrene, naphthacene, pentacene, pyrene, picene, coronene, chrysene and a derivative thereof.

In the present invention, the above-described materials can be suitably used as the polyphenylene compound, and the above-described materials can be suitably used as the polycyclic aromatic.

The particle of the negative electrode active material preferably contains a component having a structure in which an even number of hydrogens is incorporated into at least one kind of the polyphenylene compound and the polycyclic aromatic.

Thus, the particle of the negative electrode active material contains a hydrogenated product, thereby oxidation resistance is improved, and better cycle characteristics can be obtained.

At least one kind of $Li_2SiO_3$ and $Li_4SiO_4$ can be contained in the particle of the silicon compound.

The above-described materials can be suitably used as the lithium compound to be contained in the particle of the silicon compound.

It is preferable that the particle of the silicon compound has a half value width (2θ) of a diffraction peak attributable to an Si (111) crystal plane obtained by X-ray diffraction of 1.2° or more and has a crystallite size corresponding to the crystal plane of 7.5 nm or less.

When the negative electrode active material in which the particle of the silicon compound contained therein have the above silicon crystallinity is used as a negative electrode active material of a lithium ion secondary battery, better cycle characteristics can be obtained.

In the particle of the silicon compound, it is preferable that the maximum peak intensity value A of the Si and Li silicate region given by −60 to −95 ppm as the chemical shift value, and the peak intensity value B of the $SiO_2$ region given by −96 to −150 ppm as the chemical shift value, each obtained from the $^{29}$Si-MAS-NMR spectrum, satisfy the relation A>B.

In the particle of the silicon compound, if the amount of Si and $Li_2SiO_3$ on the basis of the $SiO_2$ component is larger, it becomes a negative electrode active material capable of sufficiently obtaining an improved effect in battery characteristics by insertion of Li.

A test cell comprising a negative electrode which contains a mixture of the negative electrode active material and a carbon-based active material, and a counter electrode lithium is produced, and in the test cell, charging and discharging comprising charging which is to flow an electric current such that lithium is inserted into the negative electrode active material and discharging which is to flow an electric current such that lithium is released from the negative electrode active material are repeated 30 times, when a graph showing a relationship between a differentiated value in which a discharge capacity Q at each charge and discharge is differentiated by a potential V of the negative electrode on the basis of the counter electrode lithium, and the potential V, is drawn, it is preferable that the negative electrode active material exhibits a peak in a range of the potential V of the negative electrode of 0.40 V to 0.55 V at the time of discharging on and after the Xth time (1≤X≤30).

The above peak in the V–dQ/dV curve is similar to the peak of the silicon material, and a discharge curve at a higher potential side rises sharply, so that the capacity can be easily exhibited when design of the battery is carried out. In addition, if it is a material in which the peak is exhibited by charge and discharge within 30 times, it becomes a negative electrode active material in which a stable bulk is formed.

The particle of the negative electrode active material preferably has a median diameter of 1.0 μm or more and 15 μm or less.

If the median diameter is 1.0 μm or more, it is possible to suppress increase in the irreversible capacity of the battery due to increase in the surface area per mass. On the other hand, by making the median diameter 15 μm or less, particle becomes difficult to crack so that a new surface hardly comes out.

The particle of the negative electrode active material preferably contains a carbon material at the surface layer portion.

In this way, by containing the carbon material at the surface layer portion of the particle of the negative electrode active material, conductivity is improved.

An average thickness of the carbon material is preferably 10 nm or more and 5,000 nm or less.

If the average thickness of the carbon material is 10 nm or more, conductivity is improved. Also, when the average thickness of the carbon material to be coated is 5,000 nm or less, by using the negative electrode active material containing such particle of the negative electrode active material for the lithium ion secondary battery, particle of the silicon compound can be secured with a sufficient amount, so that lowering in battery capacity can be suppressed.

The present invention also provides a material of a mixed negative electrode active material which comprises the negative electrode active material and a carbon-based active material.

Thus, by containing a carbon-based active material together with the negative electrode active material of the present invention (the silicon-based negative electrode active material) as a material for forming the layer of the negative electrode active material, it is possible to improve conductivity of the layer of the negative electrode active material, and to alleviate expansion stress accompanied by charging. Also, by mixing the silicon-based negative electrode active material with the carbon-based active material, battery capacity can be increased.

The present invention further provides a negative electrode for a non-aqueous electrolyte secondary battery, wherein the negative electrode comprises the material of the mixed negative electrode active material, wherein a ratio of mass of the negative electrode active material relative to the total mass of the negative electrode active material and the carbon-based active material is 6% by mass or more.

When the ratio of mass of the negative electrode active material (the silicon-based negative electrode active material) relative to the total mass of the negative electrode active material (the silicon-based negative electrode active material) and the carbon-based active material is 6% by mass or more, battery capacity can be further improved.

The present invention also provides a negative electrode for a non-aqueous electrolyte secondary battery, wherein the negative electrode comprises a layer of a negative electrode active material formed with the material of the mixed negative electrode active material, and a negative electrode current collector, wherein the layer of the negative electrode active material is formed on the negative electrode current collector, the negative electrode current collector contains carbon and sulfur, and contents thereof are each 100 ppm by mass or less.

Thus, the negative electrode current collector constituting the negative electrode contains carbon and sulfur with the above-described contents, so that deformation of the negative electrode at the time of charging can be suppressed.

The present invention further provides a lithium ion secondary battery, wherein the lithium ion secondary battery comprises, as a negative electrode, a negative electrode which contains the negative electrode active material.

When the lithium ion secondary battery using a negative electrode which contains such a negative electrode active material is employed, a battery having good cycle characteristics and initial charge/discharge characteristics together with high capacity can be obtained.

The present invention also provides a method for producing a negative electrode active material containing particle of a negative electrode active material which contains particle of a silicon compound, the method comprising: producing the particle of the negative electrode active material by producing particle of a silicon compound which contains a silicon compound ($SiO_x$: 0.5≤x≤1.6) and inserting lithium into the particle of the silicon compound; measuring the polyphenylene compound component and the polycyclic aromatic component contained in the particle of the negative electrode active material by TPD-MS; selecting particle of the negative electrode active material having a total content rate of a polyphenylene compound component and a polycyclic aromatic component measured by the TPD-MS of 1 ppm by mass or more and 4,000 ppm by mass or less; and producing a negative electrode active material by using the selected particle of the negative electrode active material.

By thus selecting the particle of the silicon-based active material and producing a negative electrode active material, a negative electrode active material which has good cycle characteristics and initial charge/discharge characteristics together with high capacity when it is used as a negative electrode active material of a lithium ion secondary battery can be produced.

The present invention further provides a method for producing a negative electrode active material containing particle of a negative electrode active material which contains particle of a silicon compound, the method comprising: producing the particle of the negative electrode active material by producing particle of a silicon compound which contains a silicon compound ($SiO_x$: $0.5 \leq x \leq 1.6$) and inserting lithium into the particle of the silicon compound; incorporating at least one kind of a polyphenylene compound component and a polycyclic aromatic component into the particle of the negative electrode active material; and producing a negative electrode active material by using the particle of the negative electrode active material into which at least one kind of the polyphenylene compound component and the polycyclic aromatic component is incorporated.

By producing the negative electrode active material as mentioned above, a negative electrode active material which has and good cycle characteristics and initial charge/discharge characteristics together with high capacity when it is used as a negative electrode active material of a lithium ion secondary battery can be produced.

At this time, the step of incorporating at least one of the polyphenylene compound component and the polycyclic aromatic component into the particle of the negative electrode active material is preferably carried out by contacting the particle of the negative electrode active material with at least one kind of the polyphenylene compound component and the polycyclic aromatic component in a dispersion, or, is carried out, in the step of inserting lithium into the particle of the silicon compound, by inserting lithium using at least one kind of the polyphenylene compound component and the polycyclic aromatic component, and making at least one kind of the used polyphenylene compound component and polycyclic aromatic component remain in the particle of the negative electrode active material.

As the step of incorporating at least one kind of the polyphenylene compound component and the polycyclic aromatic component into the negative electrode active material particle, the above-described process can be suitably used.

The present invention also provides a method for producing a lithium ion secondary battery, the method comprising: producing a negative electrode using the negative electrode active material produced by the above method for producing the negative electrode active material, and producing a lithium ion secondary battery using the produced negative electrode.

By using the negative electrode active material produced as mentioned above, a lithium ion secondary battery having good cycle characteristics and initial charge/discharge characteristics together with high capacity can be produced.

Effects of the Invention

As mentioned above, according to the negative electrode active material of the present invention, good cycle characteristics and initial charge/discharge characteristics together with high capacity when it is used as a negative electrode active material of a secondary battery. Also, in a material of a mixed negative electrode active material, a negative electrode, and a lithium ion secondary battery each containing the negative electrode active material, the same effects can be obtained. Further, according to the method for producing the negative electrode active material of the present invention, a negative electrode active material in which good cycle characteristics and initial charge/discharge characteristics can be obtained when it is used as a negative electrode active material of a lithium ion secondary battery, can be produced.

EMBODIMENTS TO CARRY OUT THE INVENTION

Figure 1:
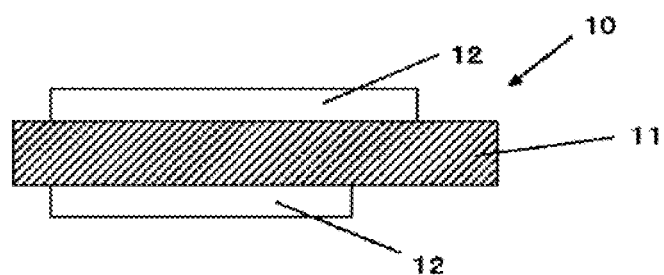
FIG. 1 is a cross-sectional view showing a constitution of a negative electrode for a non-aqueous electrolyte secondary battery of the present invention.

In the following, the present invention is described by referring to the drawing as one example of the embodiments, but the present invention is not restricted thereto.

As one of the means to increase the battery capacity of the lithium ion secondary battery, it has been investigated to use a negative electrode using a silicon material as a main material, as a negative electrode of a lithium ion secondary battery. The lithium ion secondary battery using the silicon material has been desired to have initial charge/discharge characteristics and cycle characteristics substantially equivalent to those of the lithium ion secondary battery using a carbon material, but it has not yet been proposed a negative electrode active material showing the equivalent initial charge/discharge characteristics and cycle stability to those of the lithium ion secondary battery using the carbon material.

Thus, the present inventors have intensively studied on a negative electrode active material in which good characteristics can be obtained when it is used as a negative electrode of a lithium ion secondary battery. As a result, the present inventors have found that when a negative electrode active material containing particle of the negative electrode active material, wherein particle of the negative electrode active material contained in the negative electrode active material contains particle of a silicon compound which contains a silicon compound ($SiO_x$: $0.5 \leq x \leq 1.6$), the particle of the silicon compound contains lithium, and the particle of the negative electrode active material is a negative electrode active material satisfying the relationship that a total content rate of a polyphenylene compound component and a polycyclic aromatic component measured by TPD-MS is 1 ppm by mass or more and 4,000 ppm by mass or less, is used, good cycle characteristics and initial charge/discharge characteristics can be obtained when the negative electrode active material is used as a negative electrode active material of a lithium ion secondary battery, thereby bringing the present invention to completion.

<Negative Electrode for Non-Aqueous Electrolyte Secondary Battery>

First, the negative electrode for a non-aqueous electrolyte secondary battery is described. FIG. 1 is a cross-sectional view showing a constitution of one of the embodiments of the negative electrode for a non-aqueous electrolyte secondary battery (hereinafter mentioned as "the negative electrode") of the present invention.

[Constitution of Negative Electrode]

As shown in FIG. 1, a negative electrode 10 is configured to have a layer of a negative electrode active material 12 on a negative electrode current collector 11. In addition, the layer of a negative electrode active material 12 may be provided on both sides or only one side of the negative electrode current collector 11. Further, as long as the negative electrode active material of the present invention is used, the negative electrode current collector 11 may be omitted.

[Negative Electrode Current Collector]

The negative electrode current collector 11 is an excellent conductive material, and constituted by a material having large mechanical strength. Examples of the conductive material may be mentioned, for example, copper (Cu) and nickel (Ni). The conductive material is preferably a material which does not form an intermetallic compound with lithium (Li).

The negative electrode current collector 11 preferably contains carbon (C) or sulfur (S) in addition to the main element. This is because the physical strength of the negative electrode current collector is improved. In particular, when the negative electrode has a layer of an active material that expands during charging, if the current collector contains the above-described elements, there is an effect of suppressing deformation of the electrode including the current collector. Although the contents of the contained elements are not particularly limited, it is preferable to be particularly 100 ppm by mass or less. This is because a higher suppressing effect against the deformation can be obtained.

The surface of the negative electrode current collector 11 may be roughened or may not be roughened. The roughened negative electrode current collector is, for example, a metal foil subjected to electrolytic treatment, embossing treatment, chemical etching treatment or the like. The unroughened negative electrode current collector is, for example, a rolled metal foil or the like.

[Layer of Negative Electrode Active Material]

The layer of the negative electrode active material 12 contains the negative electrode active material of the present invention which is capable of storing and releasing lithium ions, and from the viewpoint of battery design, it may further contain other materials such as a negative electrode binding agent (binder), a conductive aid, and the like. The negative electrode active material contains particle of the negative electrode active material, and the particle of the negative electrode active material contains particle of a silicon compound which contains a silicon compound ($SiO_x$: $0.5 \leq x \leq 1.6$).

In addition, the layer of the negative electrode active material 12 may contain a material of a mixed negative electrode active material which contains the negative electrode active material of the present invention and a carbon-based active material. According to this constitution, electric resistance of the layer of the negative electrode active material is lowered, and it is possible to alleviate the expansion stress accompanying charging. As the carbon-based active material, for example, thermally decomposed carbons, cokes, glassy carbon fibers, fired bodies of organic polymer compounds, carbon blacks and the like may be used.

The negative electrode of the present invention preferably has a ratio of mass of the negative electrode active material (the silicon-based negative electrode active material) relative to the total mass of the negative electrode active material of the present invention (the silicon-based negative electrode active material) and the carbon-based active material being 6% by mass or more. When the ratio of mass of the negative electrode active material of the present invention relative to the total mass of the negative electrode active material of the present invention and the carbon-based active material is 6% by mass or more, battery capacity can be certainly improved.

As mentioned above, the negative electrode active material of the present invention contains particle of the silicon compound, and the particle of the silicon compound is a silicon oxide material containing a silicon compound ($SiO_x$: $0.5 \leq x \leq 1.6$), and the composition thereof is preferably that where "x" is close to 1. This is because high cycle characteristics can be obtained. The composition of the silicon compound in the present invention does not necessarily mean purity of 100%, and a minute amount of impurity element(s) may be contained.

In the negative electrode active material of the present invention, the particle of the silicon compound contains lithium. In particular, the particle of the silicon compound can contain one or more kinds selected from $Li_2SiO_3$ and $Li_4SiO_4$. These materials are materials in which the $SiO_2$ component portion in the silicon compound, which becomes unstable when lithium is inserted and released at the time of charge and discharge of the battery, has previously been reformed into another lithium silicates, so that irreversible capacity generating at the time of charging can be reduced.

Further, by incorporating at least one kind of $Li_4SiO_4$ and $Li_2SiO_3$ inside the bulk of the particle of the silicon compound, battery characteristics are improved, and when the two kinds of the Li compounds are coexisted, battery characteristics are more improved. These lithium silicates can be quantified by NMR (Nuclear Magnetic Resonance) or XPS (X-ray photoelectron spectroscopy). Measurements of XPS and NMR can be carried out, for example, by the following conditions.

XPS

Apparatus: X-ray photoelectron spectrometer,
X-ray source: monochromated Al Kα ray,
X-ray spot diameter: 100 μm,
Ar ion gun sputtering condition: 0.5 kV/2 mm×2 mm.

$^{29}Si$ MAS NMR (Magic angle spinning nuclear magnetic resonance)

Apparatus: 700 NMR spectrometer manufactured by Bruker,

Probe: 50 µL of 4 mm HR-MAS rotor,
Sample rotation speed: 10 kHz,
Measurement environment temperature: 25° C.

In addition, the particle of the negative electrode active material of the present invention contains at least one kind of a polyphenylene compound component and a polycyclic aromatic component, and a total content rate of the polyphenylene compound component and the polycyclic aromatic component measured by TPD-MS (Temperature Programmed Desorption-Mass Spectroscopy: temperature rising thermal desorption-mass spectrometry method) is 1 ppm by mass or more and 4,000 ppm by mass or less. By using such a material as the particle of the negative electrode active material, stability to the surface of the particle of the negative electrode active material is improved by the polyphenylene compound component or the polycyclic aromatic component. Therefore, when the negative electrode active material containing such particle of the negative electrode active material is used as a negative electrode active material of a lithium ion secondary battery, a battery having good cycle characteristics and initial charge/discharge characteristics together with high battery capacity, and can be obtained. Here, measurement of TPD-MS can be carried out, for example, by charging 50 mg of a sample in a cell made of silica, heating in a helium gas flow of 50 mL/min to raise the temperature from room temperature to 1,000° C. with a rate of 10° C./min, and analyzing the generated gas with a mass spectrometer (GC/MS QP5050A, manufactured by Shimazu Corporation).

The total content rate of the polyphenylene compound component and the polycyclic aromatic component of the particle of the negative electrode active material is preferably 1 ppm by mass or more and 1,000 ppm by mass or less. If the total content rate of the polyphenylene compound component and a polycyclic aromatic component of the particle of the negative electrode active material is in the range, when the negative electrode active material containing the particle of the negative electrode active material is used as a negative electrode active material of a lithium ion secondary battery, better cycle characteristics and initial charge/discharge characteristics can be obtained.

The polyphenylene compound component contained in the particle of the negative electrode active material of the present invention can be made at least one of a biphenyl, a terphenyl and a derivative thereof. These biphenyl and terphenyl are compounds in which an aromatic ring(s) is/are linearly linked by a single bond, and called as a linear polyphenylene compound. In addition, the polycyclic aromatic contained in the particle of the negative electrode active material of the present invention can be made at least one of naphthalene, anthracene, phenanthrene, naphthacene, pentacene, pyrene, picene, coronene, chrysene and a derivative thereof. Incidentally, triphenylene has bonds of aromatic rings of cyclic, so that it is classified into a polycyclic aromatic compound. As the polyphenylene compound, the above-described materials can be suitably used, and as the polycyclic aromatic, the above-described materials can be suitably used.

The particle of the negative electrode active material of the present invention preferably contains a component having a structure in which an even number of hydrogens is incorporated into at least one kind of the polyphenylene compound and the polycyclic aromatic. Thus, when the particle of the negative electrode active material contains a hydrogenated product, oxidation resistance is improved, and better cycle characteristics can be obtained.

In the present invention, it is preferable that the particle of the silicon compound has a half value width (2θ) of a diffraction peak attributable to an Si (111) crystal plane obtained by X-ray diffraction of 1.2° or more and has a crystallite size corresponding to the crystal plane of 7.5 nm or less. It is preferable that the silicon crystallinity of the silicon compound in the particle of the silicon compound is as low as possible, and in particular, if the amount of existing Si crystal is a little, battery characteristics can be improved and a stable Li compound can be formed.

The negative electrode active material of the present invention preferably satisfies the relation, in the particle of the silicon compound, a maximum peak intensity value A of Si and Li silicate region given by −60 to −95 ppm as a chemical shift value, and a peak intensity value B of an $SiO_2$ region given by −96 to −150 ppm as a chemical shift value each obtained from $^{29}$Si-MAS-NMR spectrum satisfy a relation A>B. In the particle of the silicon compound, if an amount of the silicon component or $Li_2SiO_3$ is relatively large on the basis of the $SiO_2$ component, the effect of improving battery characteristics by insertion of Li can be sufficiently obtained.

The negative electrode active material of the present invention is preferably a material in which a test cell comprising a negative electrode which contains a mixture of the negative electrode active material and a carbon-based active material, and a counter electrode lithium is produced, and in the test cell, charging and discharging comprising charging which is to flow an electric current such that lithium is inserted into the negative electrode active material and discharging which is to flow an electric current such that lithium is released from the negative electrode active material are repeated 30 times, when a graph showing a relationship between a differentiated value dQ/dV in which a discharge capacity Q at each charge and discharge is differentiated by a potential V of the negative electrode on the basis of the counter electrode lithium, and the potential V, is drawn, a peak appears in a range of the potential V of the negative electrode of 0.40 V to 0.55 V at the time of discharging on and after the Xth time (1≤X≤30). The above peak in the V-dQ/dV curve is similar to the peak of the silicon material, and a discharge curve at a higher potential side rises sharply, so that the capacity can be easily exhibited when design of the battery is carried out. In addition, if it is a material in which the peak is exhibited by charge and discharge within 30 times, it can be judged to be a material in which a stable bulk is formed.

In the negative electrode active material of the present invention, the median diameter ($D_{50}$: particle diameter at the time that the cumulative volume is 50%) of the particle of the negative electrode active material is preferably 1.0 µm or more and 15 µm or less. If the median diameter is 1.0 µm or more, the surface area per mass can be made small, and an increase in battery irreversible capacity can be suppressed. On the other hand, by making the median diameter 15 µm or less, the particle becomes difficult to crack whereby new surface hardly comes out.

In the negative electrode active material of the present invention, the particle of the negative electrode active material preferably contains a carbon material at the surface layer portion. The particle of the negative electrode active material contains the carbon material at the surface layer portion, whereby improvement in conductivity can be obtained, so that in the case where the negative electrode active material containing such particle of the negative electrode active material is used for the negative electrode active material of the secondary battery, battery characteristics can be improved.

An average thickness of the carbon material at the surface layer portion of the particle of the negative electrode active material is preferably 10 nm or more and 5,000 nm or less. If the average thickness of the carbon material is 10 nm or more, improvement in conductivity can be obtained, while if the average thickness of the carbon material to be coated is 5,000 nm or less, in the case where the negative electrode active material containing such particle of the negative electrode active material is used for the negative electrode active material of the secondary battery, lowering in battery capacity can be suppressed.

The average thickness of the coated carbon portion can be calculated, for example, according to the following procedure. First, the particle of the negative electrode active material is observed at an arbitrary magnification by TEM (transmission electron microscope). This magnification is preferably such that the thickness of the covering portion can be visually confirmed such that the thickness can be measured. Subsequently, the thickness of the covering portion is measured at arbitrary 15 points. In this case, it is preferable to set the measurement position widely and randomly without concentrating on a specific place as much as possible. Finally, the average value of the thickness of the 15 points at the covering portion is calculated.

Although the covering rate of the carbon material is not particularly limited, it is desirable that the covering rate is as high as possible. If the covering rate is 30% or more, it is preferable since electrical conductivity is further improved. The covering method of the carbon material is not particularly limited, and a sugar carbonization method and a thermal decomposition method of a hydrocarbon gas are preferable. This is because the covering rate can be improved.

As the binder of the negative electrode contained in the layer of the negative electrode active material, for example, any one or more kinds of polymer materials, synthetic rubbers and the like can be used. Examples of the polymer material may include, for example, polyvinylidene fluoride, polyimide, polyamideimide, aramid, polyacrylic acid, lithium polyacrylate, carboxymethyl cellulose and the like. Examples of the synthetic rubber may include, for example, styrene butadiene-based rubber, fluorine-based rubber, ethylene propylene diene and the like.

As the negative electrode conductive aid, for example, any one or more kinds of carbon materials such as carbon black, acetylene black, graphite, ketjen black, carbon nanotube, carbon nanofiber and the like may be used.

The layer of the negative electrode active material can be formed, for example, by a coating method. The coating method is a method in which the particle of the negative electrode active material and the binder and the like, and, if necessary, a conductive aid, a carbon material are mixed and then dispersed in an organic solvent, water or the like and coated.

[Method for Producing Negative Electrode]

The negative electrode can be produced, for example, according to the following procedure. First, a method for producing the negative electrode active material used for the negative electrode is described. According to this method, the particle of the negative electrode active material is firstly produced by producing particle of a silicon compound containing a silicon compound ($SiO_x$: $0.5 \leq x \leq 1.6$), and inserting lithium into the particle of the silicon compound. Next, a polyphenylene compound component and a polycyclic aromatic component contained in the particle of the negative electrode active material is measured by TPD-MS, and the particle of the negative electrode active material in which a total content rate of the polyphenylene compound component and the polycyclic aromatic component measured by the TPD-MS is 1 ppm by mass or more and 4,000 ppm by mass or less is selected. Next, by using the selected particle of the negative electrode active material, a negative electrode active material is produced. According to this procedure, a negative electrode active material having high capacity and good cycle characteristics and initial charge/discharge characteristics can be produced when it is used as a negative electrode active material of a lithium ion secondary battery.

As a method of intentionally incorporating at least one of kind of the polyphenylene compound component and the polycyclic aromatic component, the following process can be carried out. First, particle of the negative electrode active material is produced by the methods for producing particle of a silicon compound containing a silicon compound ($SiO_x$: $0.5 \leq x \leq 1.6$) and inserting lithium into the particle of the silicon compound. At least one of kind of the polyphenylene compound component and the polycyclic aromatic component is incorporated into the particle of the negative electrode active material. By using the particle of the negative electrode active material into which at least one kind of the polyphenylene compound component and the polycyclic aromatic component is incorporated, a negative electrode active material is produced. According to the procedure, an amount of the total content of the polyphenylene compound component and the polycyclic aromatic component contained in the silicon compound can be easily controlled to make 1 ppm by mass or more and 4,000 ppm by mass or less.

More specifically, the negative electrode active material can be produced as follows. First, a raw material that generates a silicon oxide gas are heated at a temperature range of 900° C. to 1,600° C. under reduced pressure in the presence of an inert gas, to generate a silicon oxide gas. When the presence of surface oxygen on the metal silicon powder and a minute amount of oxygen in a reaction furnace are considered, the mixing ratio is desirably in the range of 0.8<metal silicon powder/silicon dioxide powder<1.3.

The generated silicon oxide gas is solidified and deposited on an adsorption plate. Next, at the state where the temperature in the reaction furnace is lowered at 100° C. or less, the deposit of silicon oxide is taken out and pulverized and powdered using a ball mill, a jet mill or the like. The particle of the silicon compound containing nickel can be produced as mentioned above. Incidentally, the Si crystallite in the particle of the silicon compound can be controlled by changing the temperature of vaporization, or, by the heat treatment after the formation.

Here, a layer of a carbon material may be formed at the surface layer of the particle of the silicon compound. As a method of forming a layer of the carbon material, a thermal decomposition CVD method is desirable. An example of a method for forming a layer of the carbon material by the thermal decomposition CVD is described.

First, the particle of the silicon compound is set in a furnace. Next, a hydrocarbon gas is introduced into the furnace, and the temperature in the furnace is raised. The decomposition temperature is not particularly limited, and is desirably 1,200° C. or less, more desirably 950° C. or less. By setting the decomposition temperature to 1,200° C. or less, unintended disproportionation of the particle of the active material can be suppressed. After raising the temperature in the furnace to a predetermined temperature, a carbon layer is formed on the surface of the particle of the silicon compound. The hydrocarbon gas used as the raw material of the carbon material is not particularly limited, and it is desirable that n≤3 in the composition of $C_nH_m$. If n≤3, the production cost can be lowered, and the physical properties of the decomposed product can be improved.

Next, Li is inserted into the particle of the negative electrode active material containing the particle of the silicon active material produced as mentioned above to include at least one kind of $Li_2SiO_3$ and $Li_4SiO_4$. Insertion of Li is preferably carried out by an oxidation-reduction method.

In the reforming by the oxidation-reduction method, for example, lithium can be inserted by firstly immersing the particle of the silicon oxide compound in a solution A in which lithium is dissolved in an ether solvent. This solution A may further contain a polyphenylene compound or polycyclic aromatic compound. After insertion of lithium, the particle of the silicon oxide is immersed in a solution B containing a polycyclic aromatic compound and a derivative thereof, thereby active lithium can be desorbed from the particle of the silicon oxide. As a solvent of the solution B, for example, an ether-based solvent, a ketone-based solvent, an ester-based solvent, an alcohol-based solvent, an amine-based solvent, or a mixed solvent thereof can be used. Further, after immersing in the solution B, by immersing the particle of the silicon oxide in a solution C containing an alcohol-based solvent, a carboxylic acid-based solvent, water, or a mixed solvent thereof, active lithium can be desorbed with a more amount from the particle of the silicon oxide. Instead of the solution C, a solution C' containing a compound having a quinoid structure in the molecule as a solute and containing an ether-based solvent, a ketone-based solvent, an ester-based solvent, or a mixed solvent thereof as a solvent may be used. Also, immersion of the particle of the silicon oxide in the solutions B, C and C' may be carried out repeatedly. In this manner, when the active lithium is desorbed after insertion of the lithium, it becomes a negative electrode active material having higher water resistance. Thereafter, it may be cleaned with an alcohol, an alkaline water in which lithium carbonate has been dissolved, a weak acid, pure water or the like.

Li may be also inserted into the particle of the negative electrode active material by a thermal doping method. In this case, for example, it can be reformed by mixing the particle of the negative electrode active material with LiH powder or Li powder, and heating in a non-oxidizing atmosphere. As the non-oxidizing atmosphere, for example, Ar atmosphere or the like can be used. More specifically, firstly, LiH powder or Li powder and silicon oxide powder are thoroughly mixed under Ar atmosphere, then, sealing is carried out, and stirring is carried out with the sealed container to homogenize the mixture. Thereafter, heating is carried out in the range of 700° C. to 750° C. to carry out reforming. In this case, in order to release Li from the silicon compound, a method in which powder after heating is sufficiently cooled, and then cleaning with an alcohol, an alkaline water, a weak acid, pure water or the like, can be used.

Figure 2:
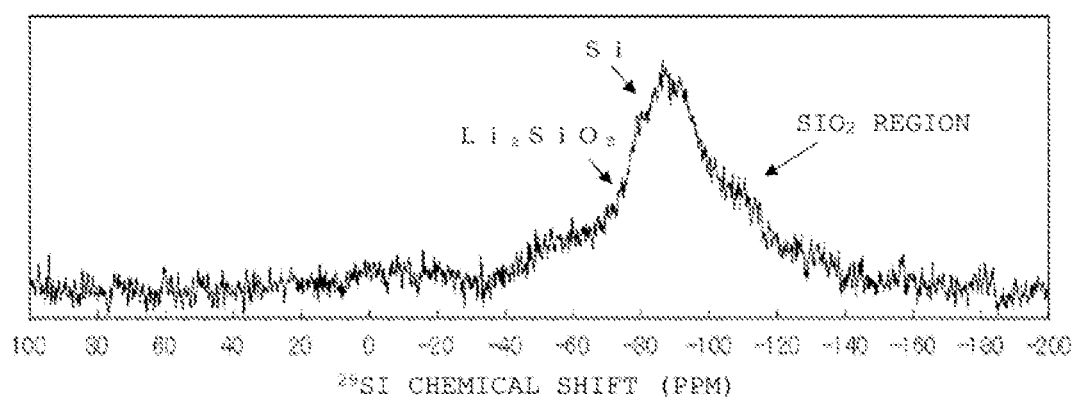
FIG. 2 is one example of $^{29}$Si-MAS-NMR spectrum measured from particle of a silicon compound when reforming is carried out by an oxidation-reduction method.

When the reforming is carried out by a thermal doping method, the $^{29}$Si-MAS-NMR spectrum obtained from the particle of the silicon compound is different from the case where the oxidation-reduction method is used. FIG. 2 shows one example of the $^{29}$Si-MAS-NMR spectrum measured from the particle of the silicon compound when the reforming is carried out by the oxidation-reduction method. In FIG. 2, a peak given in the vicinity of −75 ppm is a peak derived from $Li_2SiO_3$, and a peak given from −80 to −100 ppm is a peak derived from Si. There may be peak(s) of Li silicate(s) other than $Li_2SiO_3$ and $Li_4SiO_4$ over −80 to −100 ppm in some cases.

Figure 3:
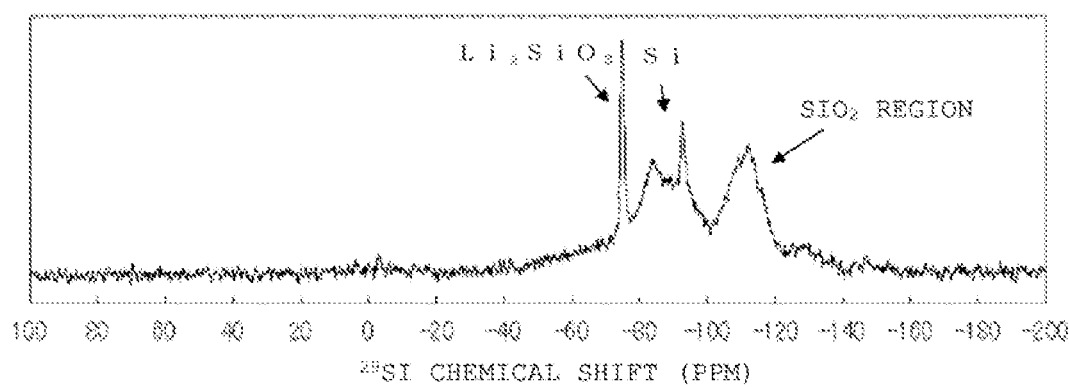
FIG. 3 is one example of $^{29}$Si-MAS-NMR spectrum measured from particle of a silicon compound when reforming is carried out by a thermal doping method.

In addition, FIG. 3 shows one example of the $^{29}$Si-MAS-NMR spectrum measured from the particle of the silicon compound when the reforming is carried out by the thermal doping method. In FIG. 3, a peak given in the vicinity of −75 ppm is a peak derived from $Li_2SiO_3$, and a peak given from −80 to −100 ppm is a peak derived from Si. There may be peak(s) of Li silicate(s) other than $Li_2SiO_3$ and $Li_4SiO_4$ over −80 to −100 ppm in some cases. The peak of $Li_4SiO_4$ can be confirmed from the XPS spectrum.

Next, by contacting the particle of the negative electrode active material after reforming with at least one kind of the polyphenylene compound component and the polycyclic aromatic component in a dispersion, at least one kind of the polyphenylene compound component and the polycyclic aromatic component is incorporated into the particle of the negative electrode active material. Specifically, processing can be carried out as follows. For example, when anthracene is incorporated into the negative electrode active material, 20 g of the particle of the negative electrode active material after reforming is dispersed in 100 ml of toluene, 2 mg of anthracene is added thereto, and the mixture is stirred for 1 hour. The obtained solution is vacuum-dried while stirring to obtain the particle of the negative electrode active material which contains anthracene. According to the procedure, at least one kind of the polyphenylene compound component and the polycyclic aromatic component can be incorporated into the particle of the negative electrode active material.

Alternatively, in the step of inserting lithium into the particle of the silicon compound, lithium is inserted by using at least one kind of the polyphenylene compound component and the polycyclic aromatic component, and by allowing at least one kind of the used polyphenylene compound component and polycyclic aromatic component to remain in the particle of the negative electrode active material, at least one kind of the polyphenylene compound component and the polycyclic aromatic component can be also incorporated into the particle of the negative electrode active material. Specifically, in the case where insertion of lithium is carried out by using the oxidation-reduction method, by maintaining the degree of vacuum at, for example, $10^1$ Pa to $10^{-1}$ Pa during the drying process at the time of reforming by the oxidation-reduction method (lithium insertion), the polyphenylene compound component and the polycyclic aromatic used at the time of reforming can be left with a suitable amount, and at least one kind of the polyphenylene compound component and the polycyclic aromatic component can be incorporated into the particle of the negative electrode active material.

Next, particle in which a total content rate of the polyphenylene compound component and the polycyclic aromatic component is 1 ppm by mass or more and 4,000 ppm by mass or less is selected from the particle of the negative electrode active material into which at least one kind of the polyphenylene compound component and the polycyclic aromatic component is incorporated.

Incidentally, selection of the particle of the negative electrode active material is not necessarily carried out every time the negative electrode active material is produced, and measurement of the content of at least one kind of the polyphenylene compound component and the polycyclic aromatic component is once carried out, and when the conditions of production in which the total content rate of the polyphenylene compound component and the polycyclic aromatic component becomes 1 ppm by mass or more and 4,000 ppm by mass or less are found out and selected, the negative electrode active material can be thereafter produced by the same conditions as the conditions at which the particle are selected.

The negative electrode active material thus produced, and other materials such as a negative electrode binder, a conductive aid and the like are mixed to form a negative electrode mixture, and then, an organic solvent, water, or the like is added thereto to prepare a slurry. Next, the slurry is coated onto the surface of a negative electrode current collector, and dried to form a layer of the negative electrode active material. At this time, hot press or the like may be carried out as necessary. The negative electrode can be produced in this manner.

<Lithium Ion Secondary Battery>

Next, the lithium ion secondary battery of the present invention is described. The lithium ion secondary battery of the present invention is a material using the negative electrode which contains the negative electrode active material of the present invention. Here, as specific examples, a laminate film type lithium ion secondary battery is mentioned as an example.

[Constitution of Laminate Film Type Secondary Battery]

Figure 4:
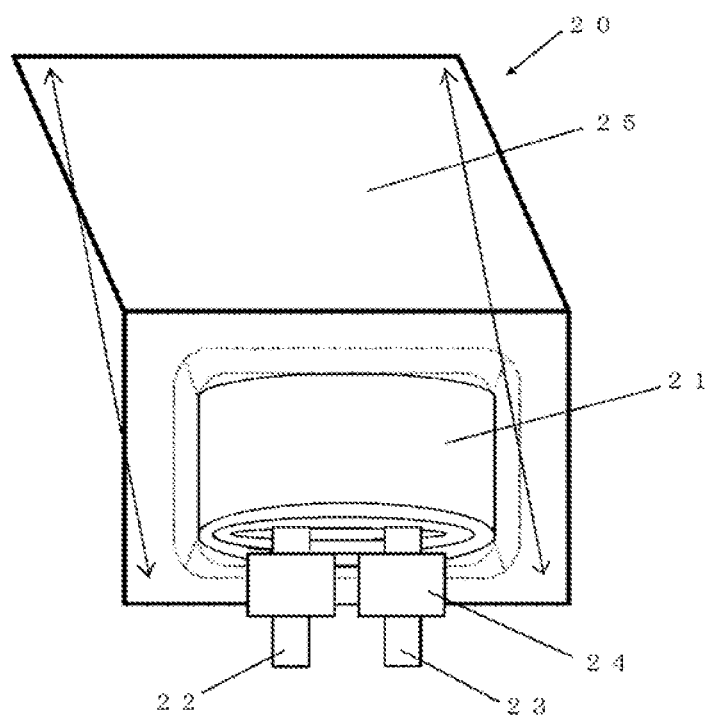
FIG. 4 is a drawing showing a constitution example (laminate film type) of a lithium secondary battery of the present invention.

The laminate film type lithium ion secondary battery 20 shown in FIG. 4 is a material in which a wound electrode body 21 is housed mainly inside of a sheet-state exterior member 25. This wound electrode body has a separator between a positive electrode and a negative electrode, and is wound. In addition, there is a case where a stacked body having a separator between a positive electrode and a negative electrode is housed. In either of the electrode bodies, a positive electrode lead 22 is attached to the positive electrode, and a negative electrode lead 23 is attached to the negative electrode. The outermost peripheral portion of the electrode body is protected by a protective tape.

The positive and negative electrode leads are, for example, led out from the inside to the outside of an exterior member in one direction. The positive electrode lead 22 is formed, for example, by a conductive material such as aluminum and the like, and the negative electrode lead 23 is formed, for example, by a conductive material such as nickel, copper and the like.

The exterior member 25 is, for example, a laminate film in which a fusion layer, a metallic layer and a surface protective layer are stacked in this order, and the laminate film is formed such that the outer peripheral edge portions of the fusion layers of the two laminated films are fused to each other or bonded with an adhesive or the like so as to face the fusion layer to the electrode body. The fusion layer is, for example, a film such as polyethylene, polypropylene and the like, and the metallic layer is an aluminum foil and the like. The protective layer is, for example, nylon and the like.

An adhesive film 24 is inserted between the exterior member 25 and the positive and negative electrode leads for the prevention of outside air intrusion. The material thereof is, for example, polyethylene, polypropylene, or polyolefin resin.

[Positive Electrode]

The positive electrode has, for example, a layer of the positive electrode active material(s) on both sides or one side of a positive electrode current collector similar to the negative electrode 10 of FIG. 1. The positive electrode current collector is formed, for example, by a conductive material such as aluminum and the like. The layer of the positive electrode active material contains any one or two or more kinds of positive electrode materials capable of storing and releasing lithium ions, and may contain other materials such as a binder, a conductive aid, a dispersant and the like depending on the design. In this case, details regarding the binder and the conductive aid can be, for example, the same as those of the negative electrode binder and the negative electrode conductive aid as already mentioned above.

As the positive electrode material, a lithium-containing compound is desirable. The lithium-containing compound may be mentioned, for example, a composite oxide comprising lithium and a transition metal element, or a phosphate compound having lithium and a transition metal element. Among these positive electrode materials, a compound having at least one kind of nickel, iron, manganese and cobalt is preferable. The chemical formulae of these positive electrode materials are represented by, for example, $Li_xM1O_2$ or $Li_yM2PO_4$. In the formulae, M1 and M2 each represent at least one transition metal element, and the values of "x" and "y" vary depending on the state of charge and discharge of the battery, and these generally represent $0.05 \leq x \leq 1.10$ and $0.05 \leq y \leq 1.10$.

Examples of the composite oxides having lithium and a transition metal element may be mentioned, for example, lithium cobalt composite oxide ($Li_xCoO_2$), lithium nickel composite oxide ($Li_xNiO_2$), and the like. Examples of the phosphate compound having lithium and a transition metal element may be mentioned, for example, lithium iron phosphate compound ($LiFePO_4$), lithium iron manganese phosphate compound ($LiFe_{1-u}Mn_uPO_4$ ($0<u<1$)), and the like. By using these positive electrode materials, high battery capacity can be obtained and excellent cycle characteristics can be also obtained.

[Negative Electrode]

The negative electrode has a structure similar to that of the negative electrode for the non-aqueous electrolyte secondary battery of FIG. 1, and has, for example, a layer of a negative electrode active material on both sides of the current collector. In this negative electrode, it is preferable that the negative electrode charge capacity is larger than the electric capacity (charge capacity as a battery) obtained from a positive electrode active material. According to this constitution, deposition of lithium metal on the negative electrode can be suppressed.

The layer of the positive electrode active material is provided on a part of both surfaces of the positive electrode current collector, and the layer of the negative electrode active material is also provided on a part of both surfaces of the negative electrode current collector. In this case, for example, the layer of the negative electrode active material provided on the negative electrode current collector is provided with a region where opposing layer of the positive electrode active material does not exist. This is to carry out a stable battery design.

At the region where the layer of the negative electrode active material and the layer of the positive electrode active material do not oppose to each other, there is almost no influence of charge and discharge. Therefore, the state of the layer of the negative electrode active material is maintained immediately after the formation, whereby the composition of the negative electrode active material or the like, can be accurately examined with good reproducibility without depending on the presence or absence of charge and discharge.

[Separator]

The separator is a material which separates the positive electrode and the negative electrode, and allows lithium ions to pass while preventing a current short circuit caused by contacting the both electrodes. This separator is made of, for example, a synthetic resin, or a porous film made of ceramic, and may have a stacked structure in which two or more kinds of porous films are stacked. The synthetic resin may be mentioned, for example, polytetrafluoroethylene, polypropylene, polyethylene, and the like.

[Electrolyte Solution]

At least a part of the layer of the active material or the separator is impregnated with a liquid electrolyte (an electrolyte solution). In this electrolyte solution, an electrolyte salt is dissolved in a solvent, and other materials such as additives and the like may be also contained.

The solvent may be used, for example, a non-aqueous solvent. The non-aqueous solvent may be mentioned, for example, ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran and the like. Among these, it is desirable to use at least one of ethylene carbonate, propylene carbonate, dimethyl carbonate, diethyl carbonate and ethyl methyl carbonate. This is because better characteristics can be obtained. In this case, by using a high viscosity solvent such as ethylene carbonate, propylene carbonate or the like, in combination with a low viscosity solvent such as dimethyl carbonate, ethyl methyl carbonate, diethyl carbonate or the like, dissociation property and ion mobility of the electrolyte salt can be improved.

In the case of using an alloy-based negative electrode, it is particularly desirable that at least one of a halogenated linear carbonic acid ester and a halogenated cyclic carbonic acid ester is contained as a solvent. According to this constitution, a stable coating film is formed on the surface of the negative electrode active material at the time of charge and discharge, particularly at the time of charging. The halogenated linear carbonic acid ester means a linear carbonic acid ester having a halogen as a constituent element (at least one hydrogen is substituted by a halogen). Also, the halogenated cyclic carbonic acid ester means a cyclic carbonic acid ester having a halogen as a constituent element (that is, at least one hydrogen is substituted by a halogen).

The kind of the halogen is not particularly limited, and fluorine is preferable. This is because a coating film having better quality than the other halogens is formed. In addition, the number of the halogens is desirably as large as possible. This is because the obtained coating film is more stable and the decomposition reaction of the electrolytic solution is reduced.

The halogenated linear carbonic acid ester may be mentioned, for example, fluoromethyl methyl carbonate, difluoromethyl methyl carbonate and the like. The halogenated cyclic carbonic acid ester may be mentioned 4-fluoro-1,3-dioxolan-2-one, 4,5-difluoro-1,3-dioxolan-2-one and the like.

As a solvent additive, it is preferable to contain an unsaturated carbon bond cyclic carbonic acid ester. This is because a stable coating film is formed on the surface of the negative electrode at the time of charge and discharge, and the decomposition reaction of the electrolytic solution can be suppressed. The unsaturated carbon bond cyclic carbonic acid ester may be mentioned, for example, vinylene carbonate, vinyl ethylene carbonate and the like.

It is also preferable that sultone (cyclic sulfonic acid ester) is contained as a solvent additive. This is because chemical stability of the battery is improved. The sultone may be mentioned, for example, propane sultone and propene sultone.

Further, it is preferable that the solvent contains an acid anhydride. This is because chemical stability of the electrolytic solution is improved. Examples of the acid anhydride may include, for example, propane disulfonic acid anhydride.

The electrolyte salt may include, for example, at least one of light metal salts such as a lithium salt and the like. The lithium salt may be mentioned, for example, lithium hexafluorophosphate ($LiPF_6$), lithium tetrafluoroborate ($LiBF_4$), and the like.

The content of the electrolyte salt is preferably 0.5 mol/kg or more and 2.5 mol/kg or less relative to the solvent. This is because high ion conductivity can be obtained.

[Method for Producing Laminate Film Type Secondary Battery]

Initially, a positive electrode is produced by using the positive electrode material. First, a positive electrode active material and, if necessary, a binder, a conductive aid and the like are mixed to form a positive electrode mixture, and then, dispersed in an organic solvent to prepare a positive electrode mixture slurry. Subsequently, the mixture slurry is coated to the positive electrode current collector with a coating apparatus such as a knife roll, a die coater having a die head and the like, and dried with hot air to obtain a layer of the positive electrode active material. Finally, the layer of the positive electrode active material is compression molded by a roll press machine or the like. At this time, the material may be heated, or heating may be repeated a plurality of times.

Here, the layer of the positive electrode active material is formed on the both surfaces of the positive electrode current collector. At this time, a coated length of the active material on both surfaces may be deviated.

Next, the same operation procedure as in the negative electrode for the non-aqueous electrolyte secondary battery is carried out, a layer of a negative electrode active material is formed on the negative electrode current collector to produce a negative electrode.

At the time of producing the positive electrode and the negative electrode, respective layers of the active materials are formed on both surfaces of the positive electrode and the negative electrode current collector. At this time, a coated length of the active material on both surfaces of either of the electrodes may be deviated (see FIG. 1).

Subsequently, an electrolytic solution is prepared. Then, a positive electrode lead is attached to the positive electrode current collector and a negative electrode lead is attached to the negative electrode current collector by ultrasonic welding or the like. Subsequently, the positive electrode and the negative electrode are stacked or wound through a separator to produce a wound electrode body, and a protective tape is adhered to the outermost peripheral portion thereof. Next, the wound body is molded so as to have a flat shape. Then, after the wound electrode body is sandwiched between the folded film-shaped exterior members, the insulation portions of the exterior member are adhered to each other by a thermal fusion method, and in a state in which only one direction is released, the wound electrode body is sealed. An adhesive film is inserted between the positive electrode lead and the exterior member, and between the negative electrode lead and the exterior member. Then, a prescribed amount of the prepared electrolyte solution was charged from the released portion and subjected to vacuum impregnation. After impregnation, the released portion is bonded by a vacuum thermal fusion method. The laminate film type secondary battery can be thus produced.

EXAMPLES

In the following, the present invention will be described more specifically with reference to Examples and Comparative Examples, but the present invention is not restricted thereto.

Example 1-1

According to the following procedure, the laminate film type lithium secondary battery 20 shown in FIG. 4 was produced.

A positive electrode was firstly produced. A positive electrode mixture was prepared by mixing 95% by mass of $LiNi_{0.7}Co_{0.25}Al_{0.05}O$ which is a lithium nickel cobalt composite oxide as a positive electrode active material, 2.5% by mass of a positive electrode conductive aid, and 2.5% by mass of a positive electrode binder (polyvinylidene fluoride: PVDF). Subsequently, the positive electrode mixture was dispersed in an organic solvent (N-methyl-2-pyrrolidone: NMP) to form a paste-state slurry. Then, the slurry was applied on both surfaces of the positive electrode current collector by a coating apparatus having a die head and dried with a hot air drying apparatus. At this time, as the positive electrode current collector, that having a thickness of 15 μm was used. Finally, compression molding was carried out with a roll press.

Next, a negative electrode was produced. The negative electrode active material was prepared by introducing a raw material obtained by mixing metal silicon and silicon dioxide into a reaction furnace, vaporizing it in an atmosphere having a degree of vacuum of 10 Pa and depositing it on an adsorption plate, and after sufficiently cooling, taking out the deposit material and pulverizing the same with a ball mill. The value of "x" of $SiO_x$ of the thus obtained particle of the silicon compound was 0.5. Subsequently, the particle size of the particle of the silicon compound was adjusted by classification. Thereafter, a carbon material was coated on the surface of the particle of the silicon compound by subjecting to thermal CVD, the particle of silicon compound which was coated with the carbon material was used as the particle of the negative electrode active material.

Subsequently, lithium was inserted into the particle of the negative electrode active material by an oxidation-reduction method and reformed. First, the particle of the negative electrode active material was immersed in a solution (solution $A_1$) in which lithium pieces and biphenyl had been dissolved in tetrahydrofuran (hereinafter also referred to as THF). The solution $A_1$ of Example 1-1 was prepared by dissolving biphenyl in a THF solvent at a concentration of 1 mol/L, and then adding lithium pieces with a mass content of 10% by mass to the mixed solution of THF and biphenyl. In addition, the temperature of the solution when the particle of the negative electrode active material is immersed therein was 20° C. and an immersion time was made 10 hours. Thereafter, the particle of the negative electrode active material was collected by filtration. According to the above procedure, lithium was inserted into the particle of the negative electrode active material.

Next, the particle of the negative electrode active material after insertion of the lithium was immersed in a solution (solution B) in which naphthalene has been dissolved in THF. The solution B of Example 1-1 was prepared by dissolving naphthalene in a THF solvent at a concentration of 2 mol/L. The temperature of the solution at the time of immersing the particle of the negative electrode active material therein was made 20° C., and the immersion time was 20 hours. Thereafter, the particle of the negative electrode active material was collected by filtration.

Then, the particle of the negative electrode active material after contacting with the solution B was immersed in a solution (solution C) in which p-benzoquinone was dissolved in THF at a concentration of 1 mol/L. The immersion time was made 2 hours. Thereafter, the particle of the negative electrode active material was collected by filtration.

Next, the particle of the negative electrode active material was subjected to cleaning treatment, and the particle of the negative electrode active material after the cleaning treatment was subjected to drying treatment under reduced pressure. At this time, the biphenyl used at the time of reforming remains in the particle of the negative electrode active material. According to this procedure, biphenyl which is the polyphenylene compound can be contained in the particle of the negative electrode active material.

The particle of the negative electrode active material prepared as mentioned above and a carbon-based active material were formulated with a mass ratio of 1:9 to produce a negative electrode active material. Here, as the carbon-based active material, a material in which natural graphite coated with a pitch layer and artificial graphite coated with the pitch layer had been mixed with a mass ratio of 5:5 was used. The median diameter of the carbon-based active material was 20 μm.

Next, the produced negative electrode active material, conductive aid 1 (carbon nanotube, CNT), a conductive aid 2 (carbon fine particle having the median diameter of about 50 nm), styrene-butadiene rubber (styrene-butadiene copolymer, hereinafter referred to as SBR), carboxymethyl cellulose (hereinafter referred to as CMC) were mixed at a dry mass ratio of 92.5:1:1:2.5:3, and then diluted with pure water to prepare a negative electrode mixture slurry. The SBR and CMC are negative electrode binders (negative electrode binding agents).

As the negative electrode current collector, an electrolytic copper foil having a thickness of 15 μm was used. In this electrolytic copper foil, carbon and sulfur were each contained in a concentration of 70 ppm by mass. Finally, a slurry of the negative electrode mixture was coated to the negative electrode current collector and dried at 100° C. for 1 hour in a vacuum atmosphere. The deposited amount of the layer of the negative electrode active material per unit area on one surface of the negative electrode (also called as area density) after drying was about 5 mg/cm².

Next, after mixing the solvents (4-fluoro-1,3-dioxolane-2-one (FEC), ethylene carbonate (EC) and dimethyl carbonate (DMC)), an electrolyte salt (lithium hexafluorophosphate: $LiPF_6$) was dissolved therein to prepare an electrolytic solution. In this case, the composition of the solvent was made FEC:EC:DMC=10:20:70 in a volume ratio, and the content of the electrolyte salt was made 1.2 mol/kg relative to the solvent.

Next, a secondary battery was assembled as follows. First, an aluminum lead was ultrasonically welded to one end of the positive electrode current collector, and a nickel lead was welded to one end of the negative electrode current collector. Subsequently, a positive electrode, a separator, a negative electrode, and a separator were stacked in this order and wound in a longitudinal direction to obtain a wound electrode body. The winding end portion was fixed with a PET protective tape. As the separator, a stacked film (thickness: 12 μm) in which a film containing porous polypropylene as a main component was sandwiched by films containing porous polyethylene as a main component was used. Subsequently, after sandwiching the electrode body between exterior members, outer peripheral edges except for one side were thermally fused, and the electrode body was accommodated inside thereof. As the exterior member, an aluminum laminate film in which a nylon film, an aluminum foil and a polypropylene film had been stacked was used. Then, the prepared electrolyte solution was injected from the opening, impregnated in a vacuum atmosphere, then heat fused and sealed.

The cycle characteristics and the first time charge/discharge characteristics of the secondary battery produced as mentioned above were evaluated.

The cycle characteristics were examined as follows. First, for battery stabilization, 2nd cycle discharge capacity was measured by carrying out two cycles of charge and discharge at 0.2 C in an atmosphere at 25° C. Subsequently, charge and discharge was carried out until the total number of cycles reached 499th cycles, and the discharge capacity was measured each time. Finally, the discharge capacity at the 500th cycle obtained charge and discharge at 0.2 C was divided by the discharge capacity at the 2nd cycle to calculate the capacity retention rate (hereinafter also simply referred to as retention rate). In the normal cycle, that is, from the third cycle to the 499th cycle, charging and discharging was carried out with 0.7 C charging and 0.5 C discharging.

When the first time charge/discharge characteristics are to be examined, first time efficiency (hereinafter sometimes also referred to as initial efficiency) was calculated. The first time efficiency was calculated from the formula represented by the first time efficiency (%)=(first time discharge capacity/first time charge capacity)×100. The atmospheric temperature was set in the same manner as in the case where the cycle characteristics were examined.

Example 1-2 and Example 1-3, and Comparative Examples 1-1 and 1-2

A secondary battery was produced in the same manner as in Example 1-1 except for adjusting an amount of oxygen in the bulk of the silicon compound. In this case, the amount of oxygen was adjusted by changing the ratio of metal silicon and silicon dioxide in the raw material of the silicon compound or the heating temperature. The value of "x" of the silicon compound represented by $SiO_x$ in Examples 1-1 to 1-3, and Comparative Examples 1-1 and 1-2 are shown in Table 1.

At this time, the particle of the silicon-based active material of Examples 1-1 to 1-3 and Comparative Examples 1-1 and 1-2 had the following properties. $Li_2SiO_3$ and $Li_4SiO_4$ were contained inside of the particle of the silicon compound in the particle of the negative electrode active material. The median diameter $D_{50}$ of the particle of the negative electrode active material was 4.0 μm. The silicon compound had a half value width (2θ) of a diffraction peak attributable to the Si (111) crystal plane obtained by X-ray diffraction of 2.257°, and had a crystallite size caused by the Si (111) crystal plane of 3.77 nm.

In all of the Examples and Comparative Examples, peaks of Si and Li silicate region which are given as chemical shift values obtained from the $^{29}$Si-MAS-NMR spectrum at −60 to −95 ppm were appeared. Also, in all of the Examples and Comparative Examples, the relationship between a maximum peak intensity value A of the Si and Li silicate region given as −60 to −95 ppm, and a peak intensity value B of the $SiO_2$ region given as −96 to −150 ppm as the chemical shift value obtained from the $^{29}$Si-MAS-NMR spectrum was A>B.

The average thickness of the carbon material contained in the particle of the negative electrode active material was 100 nm.

Also, 50 mg of the particle of the negative electrode active material was taken out, and the content of the polyphenylene compound component and the polycyclic aromatic component contained in the particle of the negative electrode active material was determined using the TPD-MS method. As a result, biphenyl was mainly detected as the polyphenylene compound component, and the total content rate the polyphenylene compound component and the polycyclic aromatic component was 200 ppm by mass. According to this measurement by TPD-MS, a compound in which two hydrogens are incorporated into the biphenyl (hereinafter referred to as "biphenyl-2H") was detected.

Further, a coin battery type test cell of 2032 size was produced from the negative electrode produced as mentioned above, and a counter electrode lithium, and its discharge behavior was evaluated. More specifically, firstly, constant current constant voltage charge was carried out to 0 V relative to the counter electrode Li, and charging was terminated when the current density reached 0.05 mA/cm². Thereafter, a constant current discharge was carried out up to 1.2 V. The current density at this time was 0.2 mA/cm². This charging and discharging was repeated 30 times, and a graph was drawn with the change rate of capacity (dQ/dV) on the vertical axis and voltage (V) on the horizontal axis from the data obtained at each charge and discharge, and whether a peak was obtained in the range of V of 0.4 to 0.55 (V) or not was confirmed. As a result, in Comparative Example 1-1 in which "x" of SiOx is less than 0.5, the peak was not obtained. In the other Examples and Comparative Examples, the peak was obtained in charging and discharging within 30 times, and the peak was obtained in all charging and discharging from the charge and discharge in which the peak first occurred to the 30th charge and discharge.

The evaluation results of Examples 1-1 to 1-3, and Comparative Examples 1-1 and 1-2 are shown in Table 1.

TABLE 1

|  | x | Capacity retention rate (%) | Initial efficiency (%) |
| --- | --- | --- | --- |
| Comparative example 1-1 | 0.3 | 46 | 88.3 |
| Example 1-1 | 0.5 | 80.1 | 86.9 |
| Example 1-2 | 1 | 80.5 | 87.8 |
| Example 1-3 | 1.6 | 80.2 | 87.0 |
| Comparative example 1-2 | 1.8 | — | — |

SiOx $D_{50}$ = 4 μm, Graphite (Natural graphite:Artificial graphite = 5:5) $D_{50}$ = 20 μm, SiOx ratio: 10% by mass, $Li_2SiO_3$, $Li_4SiO_4$, Carbon material Average thickness: 100 nm, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component: Biphenyl, Hydrogenated polyphenylene compound component: Biphenyl-2H As shown in Table 1, in the silicon compound represented by SiOx, if the value "x" is out of the range of 0.5≤x≤1.6, battery characteristics were worsened. For example, as shown in Comparative Example 1-1, when oxygen is not present sufficiently (x=0.3), whereas first time efficiency is improved, capacity retention rate is markedly worsened. On the other hand, as shown in Comparative Example 1-2, when the amount of oxygen was large (x=1.8), lowering in conductivity was generated and a capacity of the silicon oxide did not substantially appear, so that evaluation was stopped.

Example 2-1 and Example 2-2

A secondary battery was produced in the same conditions as in Example 1-2 except for changing the kind of lithium silicate contained inside of the particle of the silicon compound as shown in Table 2, and cycle characteristics and initial efficiency were evaluated. The kind of the lithium silicate was controlled by changing the conditions of the lithium insertion step by the oxidation-reduction method.

Comparative Example 2-1

A secondary battery was produced in the same conditions as in Example 1-2 except for not inserting lithium into the particle of the negative electrode active material, and cycle characteristics and initial efficiency were evaluated.

The results of Example 2-1, Example 2-2, and Comparative Example 2-1 are shown in Table 2.

TABLE 2

| | Lithium silicate | Capacity retention rate (%) | Initial efficiency (%) |
| --- | --- | --- | --- |
| Example 2-1 | $Li_2SiO_3$ | 80.0 | 86.5 |
| Example 2-2 | $Li_4SiO_4$ | 80.1 | 86.1 |
| Example 1-2 | $Li_2SiO_3$, $Li_4SiO_4$ | 80.5 | 87.8 |
| Comparative example 2-1 | — | 78.0 | 82.5 |

SiOx x = 1, $D_{50}$ = 4 μm, Graphite (Natural graphite:Artificial graphite = 5:5) $D_{50}$ = 20 μm, SiOx ratio 10% by mass, Carbon material Average thickness: 100 nm, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component: Biphenyl, Hydrogenated polyphenylene compound component: Biphenyl-2H When the silicon compound contained stable lithium silicate such as $Li_2SiO_3$ and $Li_4SiO_4$, cycle characteristics, and initial charge/discharge characteristics were improved. In particular, when it contained lithium silicates of both $Li_2SiO_3$ and $Li_4SiO_4$, cycle characteristics, and initial charge/discharge characteristics were more improved. On the other hand, in Comparative Example 2-1 in which no reforming was carried out and no lithium silicate was contained, cycle characteristics, and initial charge/discharge characteristics were lowered.

Example 3-1 to Example 3-4, and Comparative Examples 3-1 and 3-2

A secondary battery was produced in the same conditions as in Example 1-2 except for changing the total content rate of the polyphenylene compound component and the polycyclic aromatic component of the particle of the negative electrode active material to that shown in Table 3, and cycle characteristics and initial efficiency were evaluated. The total content rate of the polyphenylene compound component and the polycyclic aromatic component was adjusted by changing the amount of the polyphenylene compound component and the polycyclic aromatic added to the respective solutions used in the lithium inserting step by the oxidation-reduction method, the immersing time of the particle of the negative electrode active material and the like, to change the amount remained in the negative electrode active material.

TABLE 3

| | Total content rate of polyphenylene compound component and polycyclic aromatic component (ppm by mass) | Capacity retention rate (%) | Initial efficiency (%) |
| --- | --- | --- | --- |
| Comparative example 3-1 | NA (less than detection limit) | 75.2 | 86.9 |
| Example 3-1 | 1 | 80.3 | 87.5 |
| Example 1-2 | 200 | 80.5 | 87.8 |
| Example 3-2 | 1,000 | 80.2 | 87.6 |
| Example 3-3 | 2,000 | 80.0 | 87.4 |
| Example 3-4 | 4,000 | 79.7 | 87.3 |
| Comparative example 3-2 | 4,500 | 77.5 | 87.1 |

SiOx x = 1, $D_{50}$ = 4 μm, Graphite (Natural graphite:Artificial graphite = 5:5) $D_{50}$ = 20 μm, SiOx ratio: 10% by mass, Carbon material Average thickness: 100 nm, Peak of dQ/dV: Present, Half value width: 2.257°, Crystallite: 3.77 nm, Reforming method: Oxidation-reduction, A > B, Polyphenylene compound component: Biphenyl, Hydrogenated polyphenylene compound component: Biphenyl-2H From Table 3, as in Examples 3-1 to 3-4, when the total content rate of the polyphenylene compound component and the polycyclic aromatic component is in the range of 1 ppm by mass or more and 4,000 ppm by mass or less, cycle characteristics, and initial charge/discharge characteristics were improved. On the other hand, in Comparative Examples 3-1 and 3-2, which are out of the range, cycle characteristics, and initial charge/discharge characteristics were lowered. In particular, the battery characteristics were particularly excellent when the total content rate of the polyphenylene compound component and the polycyclic aromatic component was in the range of 1 ppm by mass or more and 1,000 ppm by mass or less.

Example 4-1

A secondary battery was produced in the same conditions as in Example 1-2 except for changing the polyphenylene compound component and the polycyclic aromatic component contained in the particle of the negative electrode active material to that shown in Table 4, and cycle characteristics and initial efficiency were evaluated. The polyphenylene compound component and the polycyclic aromatic component contained in the particle of the negative electrode active material were adjusted by controlling the kind of the polyphenylene compound component and the polycyclic aromatic added to the respective solutions used in the lithium inserting step by the oxidation-reduction method, the immersing time to the respective solutions, and the like.

TABLE 4

| | Polyphenylene compound component and polycyclic aromatic component | Capacity retention rate (%) | Initial efficiency (%) |
| --- | --- | --- | --- |
| Example 4-1 | Naphthalene | 80.1 | 87.6 |
| Example 1-2 | Biphenyl | 80.5 | 87.8 |

SiOx x = 1, $D_{50}$ = 4 μm, Graphite (Natural graphite:Artificial graphite = 5:5) $D_{50}$ = 20 μm, SiOx ratio: 10% by mass, Carbon material Average thickness: 100 nm, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Hydrogenated polyphenylene compound component: Biphenyl-2H As can be seen from Table 4, also in Example 4-1 in which naphthalene which is a polycyclic aromatic component is contained in the particle of the negative electrode active material, cycle characteristics and initial charge/discharge characteristics equal to those of Example 1-2 in which biphenyl is contained as the polyphenylene compound component in the particle of the negative electrode active material could be obtained.

Example 5-1

A secondary battery was produced in the same conditions as in Example 1-2 except that the particle of the negative electrode active material did not contain the component having a structure in which an even number of hydrogens was added to at least one kind of the polyphenylene compound component and the polycyclic aromatic, and cycle characteristics and initial efficiency were evaluated. Whether or not the component having a structure in which an even number of hydrogens is added to at least one kind of the polyphenylene compound component and the polycyclic aromatic the polyphenylene compound component and the polycyclic aromatic is contained, it was adjusted by controlling the kind of the polyphenylene compound component and the polycyclic aromatic used in the respective solutions, the reaction temperature of the respective solutions, and the like, in the lithium inserting step by the oxidation-reduction method.

TABLE 5

|  | Hydrogenated polyphenylene compound component and hydrogenated polycyclic aromatic component | Capacity retention rate (%) | Initial efficiency (%) |
| --- | --- | --- | --- |
| Example 5-1 | NA (less than detection limit) | 80.3 | 87.8 |
| Example 1-2 | Biphenyl-2H | 80.5 | 87.8 |

SiOx x = 1, $D_{50}$ = 4 µm, Graphite (Natural graphite:Artificial graphite = 5:5) $D_{50}$ = 20 µm, SiOx ratio: 10% by mass, Carbon material Average thickness: 100 nm, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component: Biphenyl As can be seen from Table 5, when the particle of the negative electrode active material contained the component having a structure in which an even number of hydrogens was added to at least one kind of the polyphenylene compound component and the polycyclic aromatic, cycle characteristics were more improved.

Examples 6-1 to 6-9

A secondary battery was produced in the same conditions as in Example 1-2 except for changing crystallinity of Si crystallite of the particle of the silicon compound as shown in Table 6, and cycle characteristics and first time efficiency were evaluated. The crystallinity of Si crystallite of the particle of the silicon compound can be controlled by changing the vaporization temperature of the raw materials, or the heat treatment after formation of the particle of the silicon compound. In Example 6-9, the half value width was calculated to as 20° or more, but it is a result fitted by using an analytical software and substantially no peak is obtained. Accordingly, the silicon region in the particle of the silicon compound of Example 6-9 can be said to be substantially amorphous.

TABLE 6

|  | Half value width (°) | Si (111) crystallite size (nm) | Capacity retention rate (%) | Initial efficiency (%) |
| --- | --- | --- | --- | --- |
| Example 6-1 | 0.756 | 11.42 | 78.5 | 87.6 |
| Example 6-2 | 0.796 | 10.84 | 78.8 | 87.4 |
| Example 6-3 | 1.025 | 8.55 | 79.0 | 87.5 |
| Example 6-4 | 1.218 | 7.21 | 79.0 | 87.5 |
| Example 6-5 | 1.271 | 6.63 | 80.0 | 87.4 |
| Example 6-6 | 1.854 | 4.62 | 80.1 | 87.5 |
| Example 1-2 | 2.257 | 3.77 | 80.5 | 87.8 |
| Example 6-7 | 2.593 | 3.29 | 81.0 | 87.7 |
| Example 6-8 | 10.123 | 1.524 | 81.5 | 87.8 |
| Example 6-9 | 20.221 | 0 | 81.8 | 87.7 |

SiOx x = 1, $D_{50}$ = 4 µm, Graphite (Natural graphite:Artificial graphite = 5:5) $D_{50}$ = 20 µm, SiOx ratio: 10% by mass, $Li_2SiO_3$, $Li_4SiO_4$, Carbon material Average thickness: 100 nm, Peak of dQ/dV: Present, Reforming method: Oxidation-reduction, A > B, Total content rate of polyphenylene compound component and polycyclic aromatic component: 200 ppm by mass, Polyphenylene compound component: Biphenyl, Hydrogenated polyphenylene compound component: Biphenyl-2H As can be seen from Table 6, in particular, in the low crystallinity material having the half value width of 1.2° or more and the crystallite size caused by the Si (111) face size of 7.5 nm or less, high capacity retention rate was obtained. Among these, when the silicon compound was amorphous, the best characteristics were obtained.

Example 7-1

A secondary battery was produced in the same conditions as in Example 1-2 except that the relation between the maximum peak intensity value A at the Si and Li silicate region and the peak intensity value B derived from the $SiO_2$ region of the silicon compound was made A<B, and cycle characteristics and first time efficiency were evaluated. In this case, by lowering the inserting amount of the lithium at the time of reforming, the amount of $Li_2SiO_3$ was reduced, and the intensity A of the peak derived from $Li_2SiO_3$ was made small.

TABLE 7

|  | Relationship between intensity values of A and B | Capacity retention rate (%) | Initial efficiency (%) |
| --- | --- | --- | --- |
| Example 7-1 | A < B | 80.0 | 85.8 |
| Example 1-2 | A > B | 80.5 | 87.8 |

SiOx x = 1, $D_{50}$ = 4 µm, Graphite (Natural graphite:Artificial graphite = 5:5) $D_{50}$ = 20 µm, SiOx ratio: 10% by mass, $Li_2SiO_3$, $Li_4SiO_4$, Carbon material Average thickness: 100 nm, Peak of dQ/dV: Present, Half value width: 2.257°, Crystallite: 3.77 nm, Reforming method: Oxidation-reduction, Total content rate of polyphenylene compound component and polycyclic aromatic component: 200 ppm by mass, Polyphenylene compound component: Biphenyl, Hydrogenated polyphenylene compound component: Biphenyl-2H As can be seen from Table 7, when the relationship between peak intensities was A>B, cycle characteristics and initial charge/discharge characteristics were improved.

Example 8-1

A secondary battery was produced in the same conditions as in Example 1-2 except for using a negative electrode active material in which no peak was obtained in the range of 0.40 V to 0.55 V of V in any charging and discharging, in the V–dQ/dV curve obtained in 30 times of charging and discharging in the above test cell, and cycle characteristics and initial efficiency were evaluated.

TABLE 8

|  | Peak of dQ/dV | Capacity retention rate (%) | Initial efficiency (%) |
|---|---|---|---|
| Example 8-1 | None | 80.0 | 87.0 |
| Example 1-2 | Present | 80.5 | 87.8 |

SiOx x = 1, $D_{50}$ = 4 μm, Graphite (Natural graphite:Artificial graphite = 5:5) $D_{50}$ = 20 μm, SiOx ratio: 10% by mass, $Li_2SiO_3$, $Li_4SiO_4$, Carbon material Average thickness: 100 nm, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component: Biphenyl, Hydrogenated polyphenylene compound component: Biphenyl-2H In order to raise the shape of the discharge curve more sharply, it is necessary to exhibit the discharge behavior similar to that of silicon (Si) in the silicon compound (SiOx). The silicon compound, which does not appear the peak in the range at 30 times of charge and discharge, becomes a relatively gentle discharge curve, and when it is made a secondary battery, it gave the result that initial charge/discharge characteristics were slightly lowered. If it was a material which appeared the peak by charge and discharge within 30 times, a stable bulk was formed, and cycle characteristics and initial charge/discharge characteristics were improved.

Examples 9-1 to 9-6

A secondary battery was produced in the same conditions as in Example 1-2 except for changing the median diameter of the particle of the negative electrode active material to those shown in Table 9, and cycle characteristics and first time efficiency were evaluated.

TABLE 9

|  | Median diameter (μm) | Capacity retention rate (%) | Initial efficiency (%) |
|---|---|---|---|
| Example 9-1 | 0.1 | 78.9 | 87.1 |
| Example 9-2 | 0.5 | 80.0 | 87.2 |
| Example 9-3 | 1 | 80.4 | 87.3 |
| Example 1-2 | 4 | 80.5 | 87.8 |
| Example 9-4 | 10 | 80.2 | 87.6 |
| Example 9-5 | 15 | 80.2 | 87.6 |
| Example 9-6 | 20 | 79.0 | 87.3 |

SiOx x = 1, Graphite (Natural graphite:Artificial graphite = 5:5) $D_{50}$ = 20 μm, SiOx ratio: 10% by mass, $Li_2SiO_3$, $Li_4SiO_4$, Carbon material Average thickness: 100 nm, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component: Biphenyl, Hydrogenated polyphenylene compound component: Biphenyl-2H As can be seen from Table 9, when the median diameter of the particle of the negative electrode active material is 1.0 μm or more, cycle characteristics were improved. This is considered to be because the surface area per mass of the silicon compound was not too large, and the area where side reaction occurred could be made small. On the other hand, when the median diameter is 15 μm or less, the particle becomes difficult to crack during charging, and SEI (solid electrolyte interface) due to the newly generated surface becomes difficult to be generated at the time of charging and discharging, so that loss of reversible Li can be suppressed. When the median diameter of the particle of the silicon-based active material is 15 μm or less, the amount of expansion of the particle of the silicon compound during charging does not become large, so that physical and electrical breakdown of the layer of the negative electrode active material due to expansion can be prevented.

Examples 10-1 to 10-4

A secondary battery was produced in the same conditions as in Example 1-2 except for changing the average thickness of the carbon material coated on the surface of the particle of the silicon-based active material, and cycle characteristics and first time efficiency were evaluated. The average thickness of the carbon material can be adjusted by changing the CVD conditions.

TABLE 10

|  | Average thickness (nm) | Capacity retention rate (%) | Initial efficiency (%) |
|---|---|---|---|
| Example 10-1 | 5 | 79.3 | 87.1 |
| Example 10-2 | 10 | 80.4 | 87.4 |
| Example 1-2 | 100 | 80.5 | 87.8 |
| Example 10-3 | 1,000 | 80.7 | 87.9 |
| Example 10-4 | 5,000 | 80.6 | 87.9 |

SiOx x = 1, $D_{50}$ = 4 nm, Graphite (Natural graphite:Artificial graphite = 5:5) $D_{50}$ = 20 nm, SiOx ratio: 10% by mass, $Li_2SiO_3$, $Li_4SiO_4$, Peak of dQ/dV: Present, Half value width: 2.257°, Crystallite: 3.77 nm, Reforming method: Oxidation-reduction, A > B, Total content rate of polyphenylene compound component and polycyclic aromatic component: 200 ppm by mass, Polyphenylene compound component and polycyclic aromatic component: Biphenyl, Hydrogenated polyphenylene compound component: Biphenyl-2H As can be seen from Table 10, since the conductivity is particularly improved when the thickness of the carbon layer is 10 nm or more, cycle characteristics and initial charge/discharge characteristics can be improved. On the other hand, if the thickness of the carbon layer is 5,000 nm or less, the amount of the particle of the silicon compound can be sufficiently secured from the design of the battery, so that battery capacity can be sufficiently secured.

Example 11-1

A secondary battery was produced in the same conditions as in Example 1-2 except for changing the reforming method to the thermal doping method, and changing the incorporating method of biphenyl which is the polyphenylene compound component, and biphenyl-2H in which two hydrogens are added to the biphenyl into the particle of the negative electrode active material, and cycle characteristics and initial efficiency were evaluated. In Example 11-1, particle of the silicon compound was firstly produced, and formation of a carbon film was carried out in the same manner as in Example 1-2. Thereafter, to the particle of the silicon compound coated by the carbon, insertion of lithium was carried out using LiH powder by the thermal doping method. Thereafter, cooling and cleaning and the like were carried out, then, 20 g of the obtained particle was dispersed in 100 ml of toluene, a mixture of biphenyl and biphenyl-2H in total of 2 mg was added thereto and the mixture was stirred for 1 hour. The obtained solution was vacuum dried while stirring to incorporate the biphenyl and the biphenyl-2H into the particle.

TABLE 11

|  | Half value width (°) | Si (111) crystallite size (nm) | Reforming method | Capacity retention rate (%) | Initial efficiency (%) |
|---|---|---|---|---|---|
| Example 11-1 | 1.755 | 4.86 | Thermal doping | 80.2 | 87.5 |

TABLE 11-continued

| | Half value width (°) | Si (111) crystallite size (nm) | Reforming method | Capacity retention rate (%) | Initial efficiency (%) |
|---|---|---|---|---|---|
| Example 1-2 | 2.257 | 3.77 | Oxidation-reduction | 80.5 | 87.8 |

SiOx x = 1, $D_{50}$ = 4 μm, Graphite (Natural graphite:Artificial graphite = 5:5) $D_{50}$ = 20 μm, SiOx ratio: 10% by mass, $Li_2SiO_3$, $Li_4SiO_4$, Carbon material Average thickness: 100 nm, Peak of dQ/dV: Present, A > B, Total content rate of polyphenylene compound component and polycyclic aromatic component: 200 ppm by mass, Polyphenylene compound component: Biphenyl, Hydrogenated polyphenylene compound component: Biphenyl-2H Even when the thermal doping method was used, good battery characteristics were obtained. In addition, crystallinity of the particle of the silicon compound was also changed by heating. In either of the reforming method, good capacity retention rate and initial efficiency were obtained.

Example 12-1

A secondary battery was produced in the same conditions as in Example 1-2 except for changing the rate of the mass of the particle of the silicon-based active material in the negative electrode active material, and the rate of increase in battery capacity was evaluated.

Figure 5:
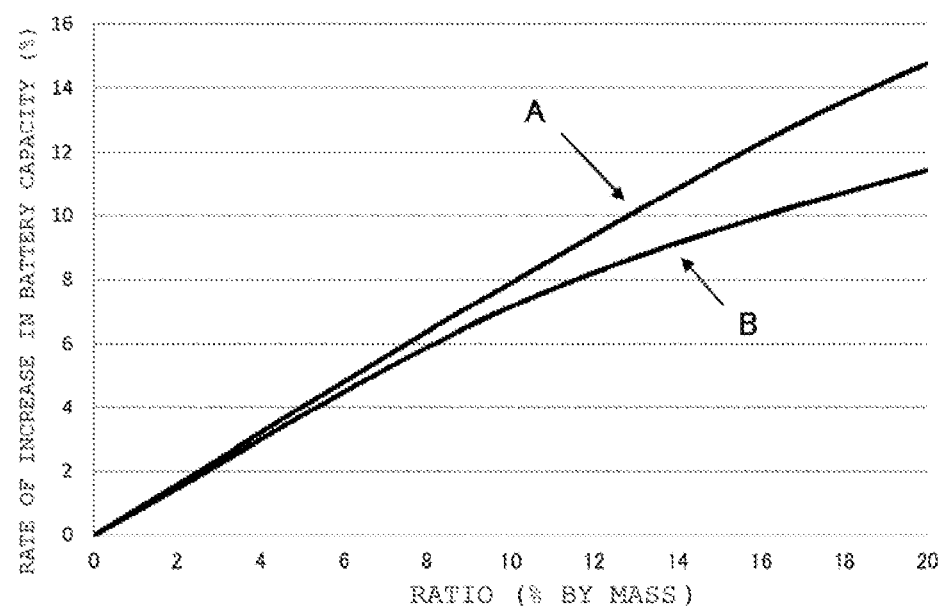
FIG. 5 is a graph showing the relationship between a ratio of particle of a silicon-based active material relative to the total amount of a negative electrode active material and a rate of increase in battery capacity of a secondary battery.

FIG. 5 is a graph showing the relationship between the ratio of the particle of the silicon-based active material to the total amount of the negative electrode active material and the rate of increase in the battery capacity of the secondary battery. The graph shown by A in FIG. 5 shows the rate of increase in battery capacity in the case of increasing the proportion of the particle of the silicon compound in the negative electrode active material of the negative electrode of the present invention. On the other hand, the graph shown by B in FIG. 5 shows the rate of increase in battery capacity when the proportion of the particle of the silicon compound in which Li is not doped is increased. As can be seen from FIG. 5, when the proportion of the silicon compound is 6% by mass or more, the increase rate of battery capacity becomes larger as compared with the conventional case, and the volume energy density increases particularly markedly.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A negative electrode active material containing particle of the negative electrode active material, wherein
the particle of the negative electrode active material contains particle of a silicon compound containing a silicon compound ($SiO_x$: 0.5≤x≤1.6),
the particle of the silicon compound contains lithium, and
the particle of the negative electrode active material has a total content rate of a polyphenylene compound component and a polycyclic aromatic component measured by TPD-MS of 1 ppm by mass or more and 4,000 ppm by mass or less.

2. The negative electrode active material according to claim 1, wherein the total content rate of the polyphenylene compound component and the polycyclic aromatic component is 1 ppm by mass or more and 1,000 ppm by mass or less.

3. The negative electrode active material according to claim 1, wherein the polyphenylene compound is at least one among a biphenyl, a terphenyl and a derivative thereof, the polycyclic aromatic is at least one among naphthalene, anthracene, phenanthrene, naphthacene, pentacene, pyrene, picene, coronene, chrysene and a derivative thereof.

4. The negative electrode active material according to claim 2, wherein the polyphenylene compound is at least one among a biphenyl, a terphenyl and a derivative thereof, the polycyclic aromatic is at least one among naphthalene, anthracene, phenanthrene, naphthacene, pentacene, pyrene, picene, coronene, chrysene and a derivative thereof.

5. The negative electrode active material according to claim 3, wherein the particle of the negative electrode active material contains a component having a structure in which an even number of hydrogen atoms is added to at least one kind of the polyphenylene compound and the polycyclic aromatic.

6. The negative electrode active material according to claim 1, wherein the particle of the silicon compound contains at least one kind of $Li_2SiO_3$ and $Li_4SiO_4$.

7. The negative electrode active material according to claim 1, wherein the particle of the silicon compound has a half value width (2θ) of a diffraction peak attributable to an Si (111) crystal plane obtained by X-ray diffraction of 1.2° or more and has a crystallite size corresponding to the crystal plane of 7.5 nm or less.

8. The negative electrode active material according to claim 1, wherein, in the particle of the silicon compound, a maximum peak intensity value A of Si and Li silicate region given by −60 to −95 ppm as a chemical shift value, and a peak intensity value B of an $SiO_2$ region given by −96 to −150 ppm as a chemical shift value each obtained from $^{29}Si$-MAS-NMR spectrum satisfy a relation A>B.

9. The negative electrode active material according to claim 1, wherein a test cell comprising a negative electrode which contains a mixture of the negative electrode active material and a carbon-based active material and a counter electrode lithium is produced, and in the test cell, charging and discharging comprising charging which is to flow an electric current such that lithium is inserted into the negative electrode active material and discharging which is to flow an electric current such that lithium is released from the negative electrode active material are repeated 30 times, when a graph showing a relationship between a differentiated value dQ/dV in which a discharge capacity Q at each charge and discharge is differentiated by a potential V of the negative electrode on the basis of counter electrode lithium, and the potential V, is drawn, the negative electrode active material exhibits a peak in a range of the potential V of the negative electrode of 0.40 V to 0.55 V at the time of discharging on and after the Xth time (1≤X≤30).

10. The negative electrode active material according to claim 1, wherein the particle of the negative electrode active material has a median diameter of 1.0 μm or more and 15 μm or less.

11. The negative electrode active material according to claim 1, wherein the particle of the negative electrode active material contains a carbon material at a surface layer portion.

12. The negative electrode active material according to claim 11, wherein an average thickness of the carbon material is 10 nm or more and 5,000 nm or less.

13. A material of a mixed negative electrode active material which comprises the negative electrode active material according to claim 1 and a carbon-based active material.

14. A negative electrode for a non-aqueous electrolyte secondary battery, wherein the negative electrode comprises the material of the mixed negative electrode active material according to claim 13, and a ratio of mass of the negative electrode active material relative to a total mass of the negative electrode active material and the carbon-based active material is 6% by mass or more.

15. A negative electrode for a non-aqueous electrolyte secondary battery which comprises:
- a layer of a negative electrode active material formed with the material of the mixed negative electrode active material according to claim 13, and
- a negative electrode current collector,
- wherein the layer of the negative electrode active material is formed on the negative electrode current collector, and
- the negative electrode current collector contains carbon and sulfur, and contents thereof are each 100 ppm by mass or less.

16. A lithium ion secondary battery, wherein the lithium ion secondary battery comprises a negative electrode which contains the negative electrode active material according to claim 1, as a negative electrode.

17. A method for producing a negative electrode active material containing particle of the negative electrode active material which contain particle of a silicon compound, the method comprising:
- producing the particle of the negative electrode active material by producing particle of a silicon compound which contains a silicon compound ($SiO_x$: $0.5 \leq x \leq 1.6$), and inserting lithium into the particle of the silicon compound;
- measuring the polyphenylene compound component and the polycyclic aromatic component contained in the particle of the negative electrode active material by TPD-MS;
- selecting particle of the negative electrode active material having a total content rate of the polyphenylene compound component and the polycyclic aromatic component measured by the TPD-MS of 1 ppm by mass or more and 4,000 ppm by mass or less; and
- producing a negative electrode active material by using the selected particle of the negative electrode active material.

18. A method for producing a negative electrode active material containing particle of the negative electrode active material which contain particle of a silicon compound, the method comprising:
- producing the particle of the negative electrode active material by producing particle of a silicon compound which contains a silicon compound ($SiO_x$: $0.5 \leq x \leq 1.6$), and inserting lithium into the particle of the silicon compound;
- incorporating at least one kind of a polyphenylene compound component and a polycyclic aromatic component into the particle of the negative electrode active material; and
- producing a negative electrode active material according to claim 1 by using the particle of the negative electrode active material to which at least one kind of the polyphenylene compound component and the polycyclic aromatic component is added.

19. The method for producing a negative electrode active material according to claim 18, wherein a step of incorporating at least one kind of the polyphenylene compound component and the polycyclic aromatic component into the particle of the negative electrode active material is carried out by contacting the particle of the negative electrode active material with at least one kind of the polyphenylene compound component and the polycyclic aromatic component in a dispersion, or is carried out, in the step of inserting lithium into the particle of the silicon compound, by inserting lithium using at least one kind of the polyphenylene compound component and the polycyclic aromatic component, and making at least one kind of the used polyphenylene compound component and the polycyclic aromatic component remain in the particle of the negative electrode active material.

20. A method for producing a lithium ion secondary battery, the method comprising: producing a negative electrode using the negative electrode active material produced by the method for producing the negative electrode active material according to claim 17; and producing a lithium ion secondary battery using the produced negative electrode.

* * * * *